(12) United States Patent
Capps

(10) Patent No.: US 7,519,667 B1
(45) Date of Patent: Apr. 14, 2009

(54) METHOD AND SYSTEM FOR INTEGRATING INSTANT MESSAGING, STREAMING AUDIO AND AUDIO PLAYBACK

(75) Inventor: Stephen P. Capps, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 10/124,091

(22) Filed: Apr. 16, 2002

Related U.S. Application Data

(60) Provisional application No. 60/285,981, filed on Apr. 23, 2001.

(51) Int. Cl.
G06F 15/16 (2006.01)

(52) U.S. Cl. .................. 709/206; 709/203; 709/205; 709/231

(58) Field of Classification Search .......... 709/206, 709/203, 205, 231
See application file for complete search history.

(56) References Cited

U.S. PATENT DOCUMENTS 5,953,005 A * 9/1999 Liu .................. 715/500.1
6,248,946 B1 * 6/2001 Dwek ................ 84/609
6,604,133 B2 * 8/2003 Aggarwal et al. ........ 709/206
6,614,729 B2 * 9/2003 Griner et al. ............ 369/1
6,675,205 B2 * 1/2004 Meadway et al. ........ 709/219
6,714,982 B1 * 3/2004 McDonough et al. ..... 709/228
6,865,600 B1 * 3/2005 Brydon et al. .......... 709/219
2002/0143959 A1 * 10/2002 El-Baze et al. ......... 709/228

OTHER PUBLICATIONS

Webster's II new Riversie University Dictionary by Houghton Mifflin Company, 2001, p. 537.*

* cited by examiner

*Primary Examiner*—Ario Etienne
*Assistant Examiner*—Sahera Halim
(74) *Attorney, Agent, or Firm*—Shook, Hardy & Bacon LLP

(57) ABSTRACT

A method and system are provided for integrating a streaming audio server application, an instant messaging client application, and a media player application. The instant messaging client application may be utilized to engage in an instant messaging session with other users. The instant messaging client application can notify participating users that an audio stream is available from the media player application. The streaming audio server obtains a selection via the instant messenger and then streams the audio track to the requestor. The streaming audio server may also be utilized to provide a streaming audio radio station at a client computer.

18 Claims, 18 Drawing Sheets

METHOD AND SYSTEM FOR INTEGRATING INSTANT MESSAGING, STREAMING AUDIO AND AUDIO PLAYBACK

CROSS-REFERENCE TO RELATED APPLICATION

This application claims the benefit of U.S. Provisional Application No. 60/285,981, filed on Apr. 23, 2001, the benefit of which is hereby claimed under U.S.C. § 119. U.S. Provisional Application No. 60/285,981 is incorporated by reference herein.

FIELD OF THE INVENTION

The present invention generally relates to the field of computer-based instant messaging. More specifically, the present invention relates to a method and system for integrating an instant messaging client application, a streaming audio server application, and an audio playback application.

BACKGROUND OF THE INVENTION

Audio player applications exist that allow users to manage and playback music on their computer. For instance, these applications typically allow a user to play compact discs, listen to audio tracks encoded in the Motion Picture Experts Group audio layer 3 format ("MP3"), listen to streaming audio available over the Internet, and to manage their collection of digital music. However, these types of programs do not allow a user to directly share their music collection with other users. Computer programs such as Napster™ and Gnutella™ have been developed that do allow users to share their music collections with other users. However, these programs do not allow sharing in real, or near real-time. Instead, these programs require users to download complete songs prior to listening to them. Depending upon the size of the file and the speed of each user's Internet connection, this process could take several minutes or longer before the user downloading the audio track is able to listen to music. Moreover, these programs do not provide any facility for two users to listen to a song at the same time. Sharing of music is a very common social activity. However, the currently available music playback applications provide no functionality for two or more remote Internet users to listen to a song at the same time.

Instant messaging applications also exist that allow two or more remote users to converse in real-time over a computing network, such as the Internet. Typically, an instant messaging server computer is utilized to facilitate instant messaging sessions. Instant messaging server computers will typically maintain a "buddy list" for each subscriber that identifies a number of users that a subscriber typically converses with. When a user identified in the buddy list signs onto the instant messaging server computer, the subscriber is notified that the user has signed on. The subscriber can then utilize an instant messaging client application to select the user from the buddy list and request an instant messaging session with the user. If the remote user accepts, a near real-time instant messaging session is initiated between the two users. Other users may also participate in the instant messaging session.

Through the use of such instant messaging applications, users may also transmit files to other users. For instance, one user may send another user an audio track. Again, however, the transfer of the audio track does not take place fast enough to listen to the music in real time. In fact, depending upon the bandwidth of each user's connection, such a transfer may take a long period of time to complete. Therefore, while instant messaging applications allow users to converse in near real-time, these types of applications also do not permit users to listen to music together in real-time.

Streaming audio server applications also exist that provide Internet-based streaming audio "radio stations." These applications typically provide a World Wide Web ("Web" or "WWW") front-end that a user may utilize to select and listen to the streaming audio radio station. Typically, a selection is made of the streaming audio radio station within the Web browser. In response to this selection, a streaming audio playback application is launched that connects to a streaming audio sever application, receives a stream of audio data, and plays the audio data. In this manner, streaming audio applications such as these provide the ability for users to listen to streaming audio in real-time. However, these applications allow no interactivity with other users while listening to the streaming audio radio station. Moreover, streaming audio server applications are typically difficult to setup and operate, and, therefore, are not utilized by individual users to share their music libraries.

Accordingly, in light of the above, there exists a need for a method and system for integrating instant messaging with streaming audio and audio playback that allows two or more users to listen to an audio track at the same time. Moreover, there exists a need for a method and system for integrating audio and instant messaging that allows users to easily share their music collections with other users while also interacting with those other users in real- or near real-time.

SUMMARY OF THE INVENTION

The present invention solves the above problems by integrating a streaming audio server application, an instant messaging client application, and a media player application. Generally described, the instant messaging client application may be utilized to engage in an instant messaging session with other users. If the media player application is utilized to play an audio track while an instant messaging session is active, the instant messaging client application will notify the participating users that an audio stream is available corresponding to the playing audio track. A user participating in the instant messaging session may then use their instant messaging client application to select the audio stream. The streaming audio server then streams the audio track to the media player application for playback. In this manner, instant messaging users may share their music collections with other users and listen to the playing music together, in real- or near real-time.

More specifically described, an instant messaging client application, a media player application, and a streaming audio server application are provided. An indication may be provided to the instant messaging client whenever the media player application is utilized to play music. Based on this indication, a presence indicator associated with the user that appears in remote users' buddy lists is updated to indicate that an audio stream is available from the user playing back audio. For instance, a speaker icon may be used to provide such an indication. This indicator may also be provided by an icon in a public directory entry associated with the user. If a remote user selects the icon, the streaming audio server will provide a streaming version of the currently playing music to a media player application executing on the remote user's computer. In this manner, two instant messaging users can simultaneously listen to the same audio track.

The streaming audio server application, media player application, and instant messaging client application may also provide functionality for users engaged in an instant messaging session, or conversation, to share their music collections. For instance, if several users are engaged in an instant messaging conversation, and one of the users is listening to music, an indication may be provided to the other users by the instant messaging client application that an audio stream is available. The other users may "tune in" to the streaming a audio broadcast of the music by selecting the indicator. In this manner, all of the users in the instant messaging conversation can listen to the same streaming audio track. If more than one participant in the instant messaging session is playing back audio, the users may be permitted to select which stream they would like to listen to. Alternatively, tracks may be played alternately or randomly from each user's streaming audio server application. In this manner, all of the users may listen to a "mix" of audio clips from each of their libraries. A separate user interface item may be provided by the instant messaging client application for selecting a mix of audio clips.

According to yet another embodiment of the present invention, the client-based streaming audio server application may be utilized to create a client-based streaming audio "radio station." Playlists may be created that define the audio tracks that are to be played on the radio station. Moreover, security rights may be assigned to the various playlists that restrict access to one or more different groups of users. An instant messaging user profile may then be updated to indicate that the user provides a streaming audio radio station. Such an indication could also be added to a Web page associated with the user. A remote user may utilize the instant messaging client application to indicate that they would like to listen to the streaming audio radio station. In this event, a streaming connection is opened between the media player application of the remote user and the streaming audio server application. In this way, the instant messaging client application provides access to Internet-based streaming audio radio stations.

Meta-data describing the currently streaming audio track may also be made available to the media player application, the instant messaging client application, or the streaming audio server. For instance, meta-data may be provided comprising the album title, song title, and artist for a currently streaming audio track. This information may then be displayed by the media player application or the instant messaging client application. An option may also be provided that allows a user to purchase the currently playing streaming audio track. If this option is selected, a Web browser window may be opened that is directed to a Web site where the user can purchase the track. Alternatively, the track may be downloaded if the track is a user-created track not subject to copyright. According to an embodiment of the present invention, the features of the streaming audio server application, instant messaging client application, and the media player application are implemented as a part of a computer operating system.

The present invention also provides a method, computer-readable medium, computer-controlled apparatus, and system for integrating streaming audio, audio playback, and instant messaging.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

As mentioned briefly above, the present invention provides a method and system for integrating an instant messaging client application, a streaming audio server application, and a media player application. According to an actual embodiment of the present invention, the instant messaging client application may be utilized to notify other instant messaging client applications that an audio stream is available. The audio stream may comprise an audio track currently being played by the media player application or a streaming audio radio station. In either case, if a remote instant messaging client application is utilized to request the available audio stream, a streaming audio connection is opened between a remote media player application and the streaming audio server application. In this manner, either the playing audio track or the radio station is streamed to the remote media player application. The instant messaging client application may also be utilized to provide an instant messaging session while the stream is played.

Figure 1:
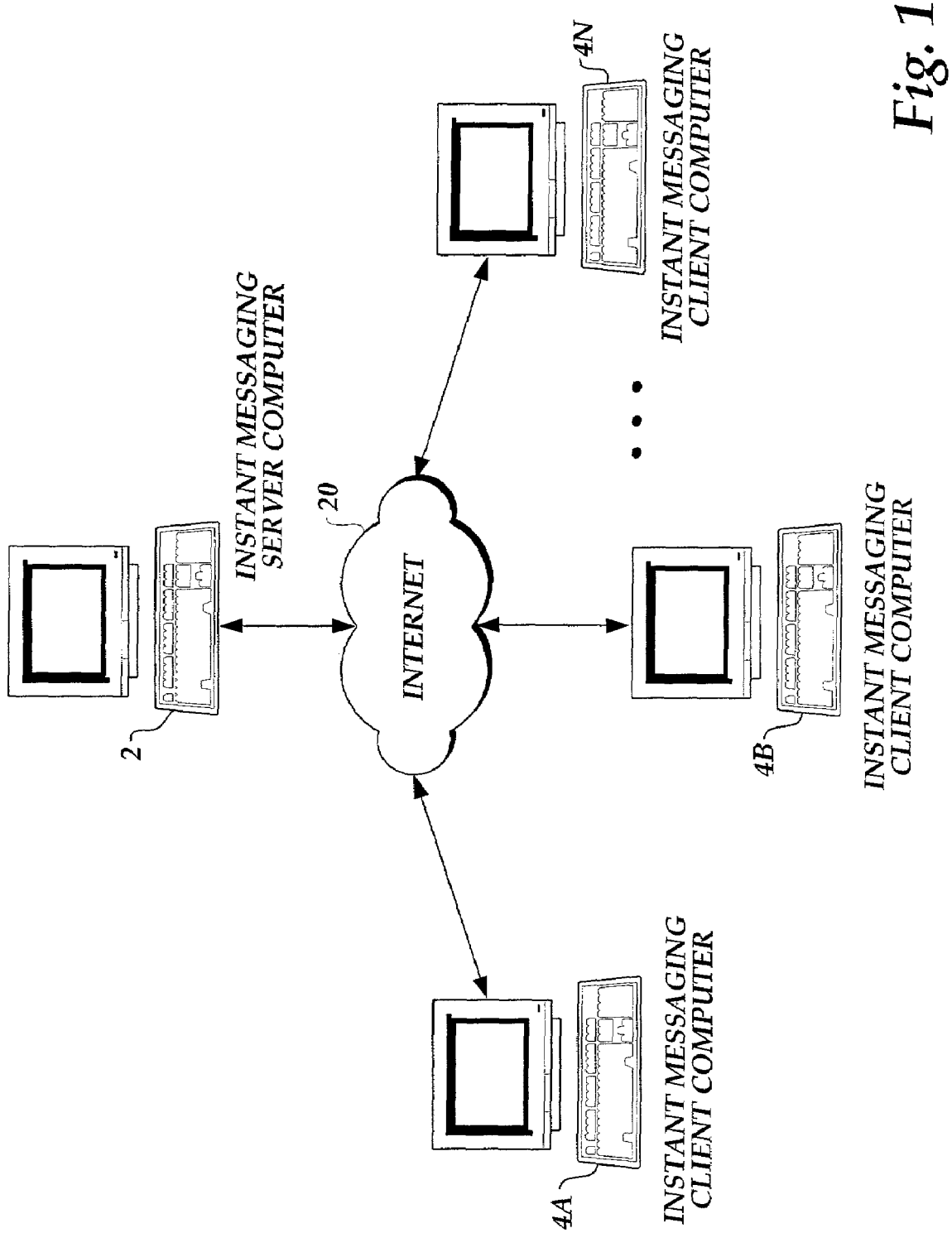
FIG. 1 is a block diagram showing an illustrative operating environment for an actual embodiment of the present invention.

Referring now to the figures, in which like numerals represent like elements, an actual embodiment of the present invention will be described. Turning now to FIG. 1, an illustrative operating environment for an actual embodiment of the present invention will be described. As shown in FIG. 1, an instant messaging server computer 2 and two or more instant messaging client computers 4A-4N communicate over the Internet 20. As is well known to those skilled in the art, the Internet 20 comprises a collection of networks and routers that use the Transmission Control Protocol/Internet Protocol to communicate with one another.

The Internet 20 typically includes a plurality of local area networks ("LANs") and wide area networks ("WANs") that are interconnected by routers. Routers are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers, such as the instant messaging server computer 2 and the instant messaging client computers 4A-4N can be remotely connected to either the LANs or the WANs via a permanent network connection or via a modem and temporary telephone link. It will be appreciated that the Internet 20 comprises a vast number of such interconnected networks, computers, and routers.

The instant messaging server computer 2 shown in FIG. 1 is operative to provide an instant messaging service. As known to those skilled in the art, the instant messaging server computer 2 maintains instant messaging user profiles, maintains on-line/off-line status for instant messaging subscribers, and facilitates the exchange of messages, files, and other information between instant messaging client applications. Examples of instant messaging services include Microsoft® Corporation's MSN Messenger Service™ brand service and AOL/Time Warner's AOL Instant Messenger™ brand service. Additional aspects regarding the operation of the instant messaging server computer 2 will be described in greater detail below with respect to FIG. 2.

The instant messaging client computers 4A-4N are operative to execute an instant messaging client application. The instant messaging client application communicates with the instant messaging server computer 2 and perhaps other instances of the instant messaging client application executing on other client computers 4A-4N. The instant messaging client application, together with the instant messaging server computer 2, is operative to provide a conventional instant messaging service. Additionally, the instant messaging client application is further operative to communicate with a media player application and a streaming audio server application to provide functionality for streaming audio tracks to other instant messaging subscribers. The instant messaging client computers 4A-4N will be described in greater detail below with reference to FIG. 3.

Figure 2:
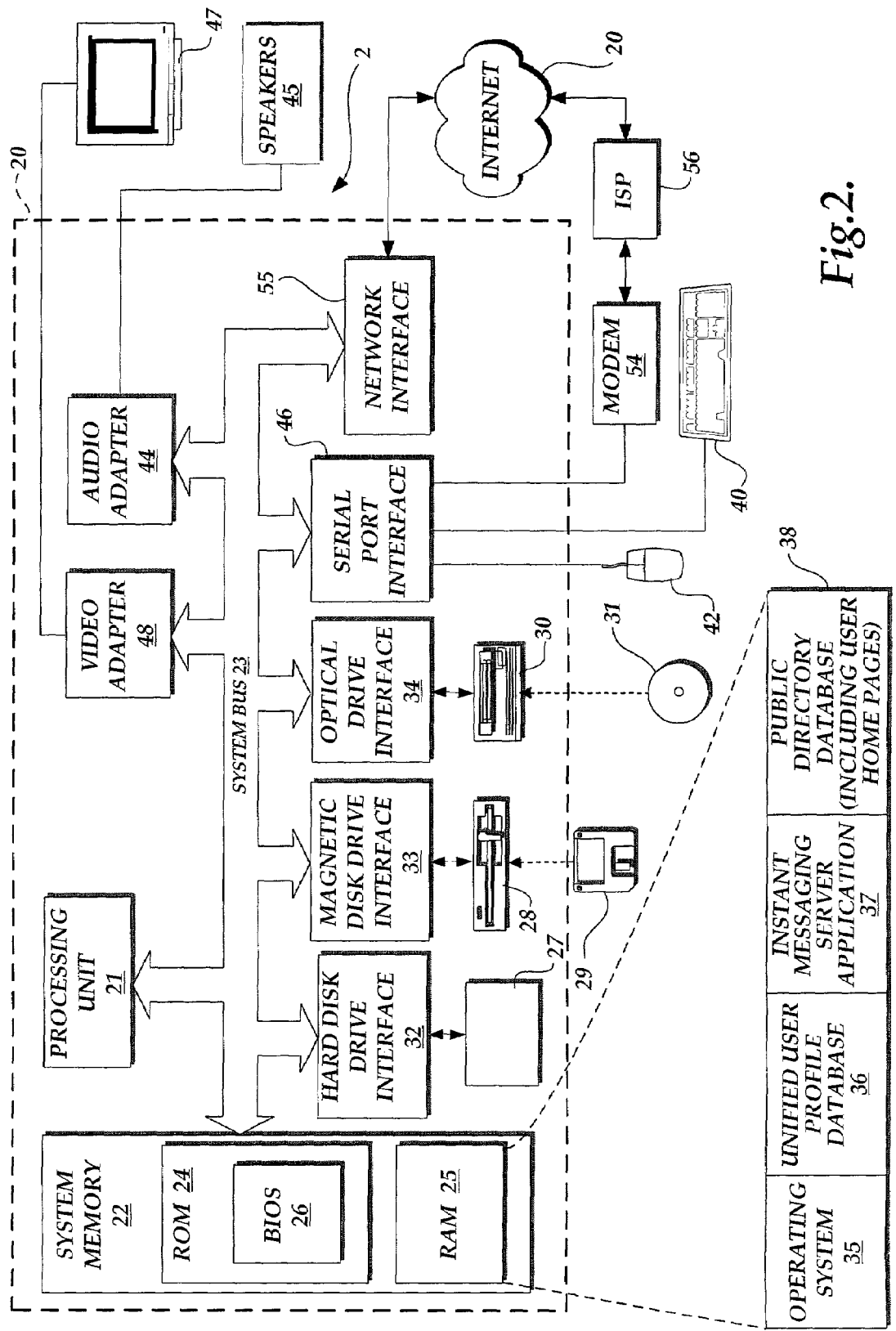
FIG. 2 is a block diagram showing an illustrative computer architecture for an instant messaging server computer utilized in an actual embodiment of the present invention.

Referring now to FIG. 2, an illustrative computer architecture for the instant messaging server computer 2 will be described. The computer architecture shown in FIG. 2 illustrates a conventional server computer, including a processing unit 21, a system memory 22, and a system bus 23 that couples the system memory 22 to the processing unit 21. The system memory 22 includes a read only memory ("ROM") 24 and a random access memory ("RAM") 25. A basic input/output system 26 ("BIOS") containing the basic routines that help to transfer information between elements within the computer, such as during start-up, is stored in ROM 24. The computer further includes a hard disk drive 27, a magnetic disk drive 28, e.g., to read from or write to a removable disk 29, and an optical disk drive 30, e.g., for reading a CD-ROM disk 31 or to read from or write to other optical media such as a Digital Versatile Disk ("DVD").

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the computer. Although the description of computer-readable media above refers to a hard disk, a removable magnetic disk and a CD-ROM disk, it should be appreciated by those skilled in the art that computer-readable media can be any available media that can be accessed by the instant messaging server computer 2. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other medium which can be used to store the desired information and which can be accessed by the computer.

A user may enter commands and information into the instant messaging server computer 2 through input devices such as a keyboard 40 or a mouse 42. Other input devices (not shown) may include a microphone, touchpad, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus ("USB") interface. A monitor 47 or other type of display device is also connected to the system bus 23 via a display interface, such as a video adapter 48. In addition to the monitor, the instant messaging server computer 2 may include other peripheral output devices, such as speakers 45 connected through an audio adapter 44 or a printer (not shown).

As described briefly above, the instant messaging server computer 2 may operate in a networked environment using logical connections to one or more remote computers through the Internet 20. The computer may connect to the Internet 20 through a network interface 55. Alternatively, the computer may include a modem 54 and use an Internet Service Provider ("ISP") 56 to establish communications with the Internet 20. The modem 54, which may be internal or external, is connected to the system bus 23 via the serial port interface 46. It will be appreciated that the network connections shown are illustrative and other means of establishing a communications link between the instant messaging server computer 2 and the Internet 20 may be used.

A number of program modules may be stored in the drives and RAM 25, including an operating system 35, such as Windows ME® or Windows 2000® brand operating systems from Microsoft® Corporation. The drives and RAM 25 may also store an instant messaging server application 37. The instant messaging server application 37 provides an instant messaging service between two or more instant messaging client computers 4A-4N. In particular, the instant messaging server application 37 mediates instant messaging conversations and serves as a router for instant messages. Instant messages are routed from one instant messaging session participant to the other participants as appropriate. The instant messaging server application 37 may also provide similar functionality for routing files between instant messaging subscribers.

The instant messaging server application 37 also maintains database records for each subscriber. In particular, the instant messaging server application 37 may maintain a unified user profile database 36. The unified user profile database 36 comprises data regarding each instant messaging subscriber including their on-line/off-line status, their internet protocol address, a pseudonym or "handle" utilized by the subscriber, and other similar information. The instant messaging server application 37 may also maintain a public directory database 38 that may be utilized when searching for an instant messaging subscriber. The public directory database 38 may also contain hyperlinks to user homepages. These and other conventional aspects of the instant messaging server application 37 are well known to those skilled in the art. Additional aspects of the instant messaging server application 37 utilized in an actual embodiment of the present invention will be described below with reference to FIGS. 4-6.

Figure 3:
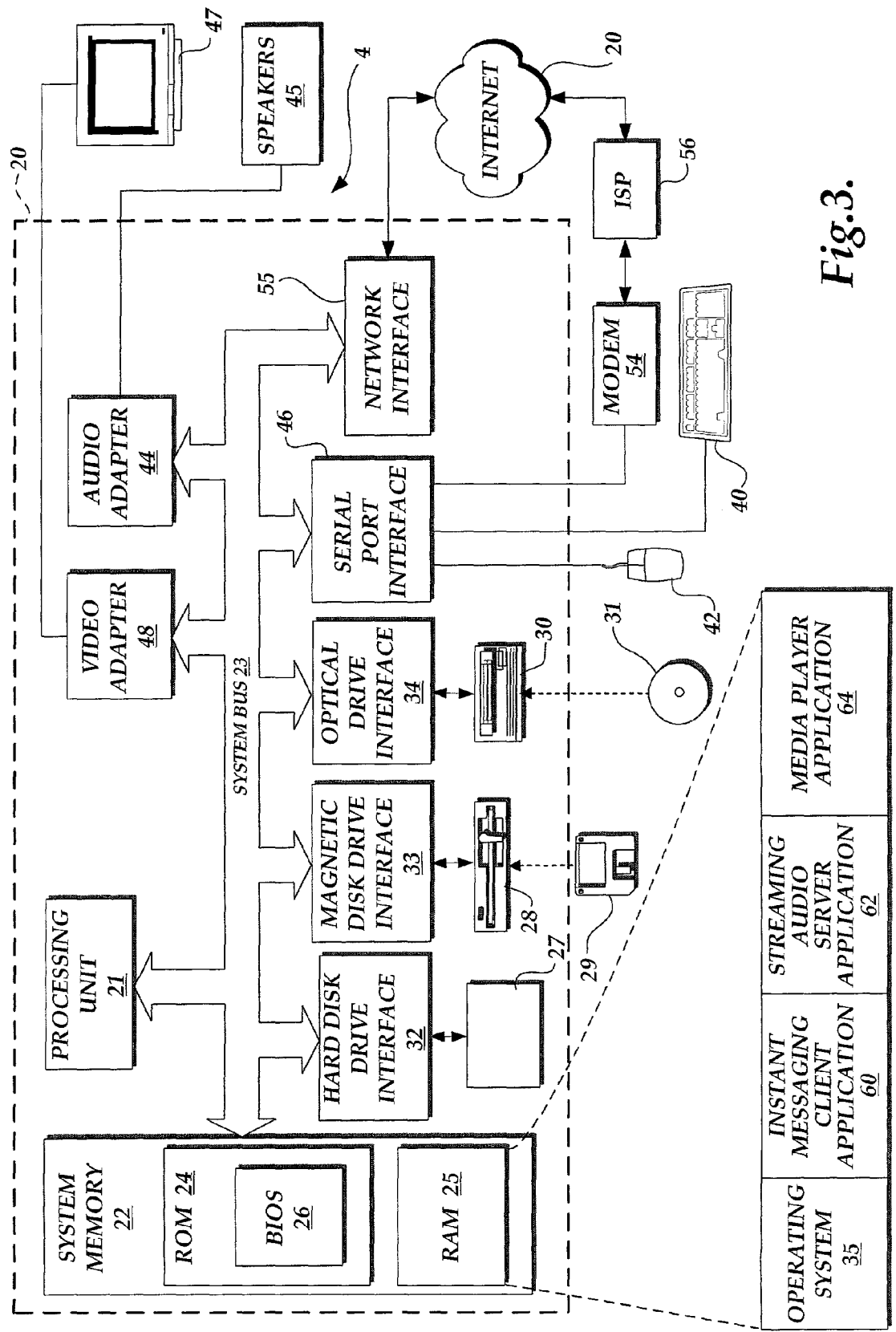
FIG. 3 is a block diagram showing an illustrative computer architecture for an instant messaging client computer utilized in an actual embodiment of the present invention.

Turning now to FIG. 3, an illustrative computer architecture will be described for an instant messaging client computer 4 utilized in an actual embodiment of the present invention. The instant messaging client computer 4 comprises a conventional personal computer as known to those skilled in the art. The instant messaging client computer 4 comprises many of the same conventional components described above with respect to FIG. 2. For the sake of brevity, the discussion regarding these convention components will not be repeated here. However, those skilled in the art should appreciate that the discussion with respect to FIG. 2 with regard to the instant messaging server computer 2 applies to the common components of the instant messaging client computer 4 shown in FIG. 3.

The instant messaging client computer 4 may also include a media player application 64 stored in the drives or RAM 25. As known to those skilled in the art, the media player application 64 may provide functionality for playing audio compact discs 31 on the computer 4, for playing MP3 files or other types of compressed audio files, and for maintaining a library of such files. An example of a media player application 64 is the Windows® Media Player application from Microsoft® Corporation. According to an embodiment of the present invention, the media player application 64 is also operative to notify an instant messaging client application 62 that a compact disc audio track or MP3 file is playing.

The instant messaging client computer 4 may include an instant messaging client application 60. The instant messaging client application 60 is operative to communicate with the instant messaging server computer 2, and other instant messaging client computers 4, to provide a conventional instant messaging service. Additionally, the instant messaging client application 60 is also operative to receive notifications from the media player application 64. In particular, the instant messaging client application 60 is operative to receive such a notification from the media player application 64 and to notify the instant messaging server computer 2 that an audio stream is available for playback. The instant messaging server computer 2 can then notify other remote instant messaging client applications 60 that an audio stream is available. A visual indication may then be provided at the remote instant messaging client computers indicating that an audio stream is available. If a user selects the visual indication, a media player application 64 executing on the remote computer is launched. The media player application 64 then requests an receives the audio stream from a streaming audio server application 62.

The streaming audio server application 62 is operative to receive requests for streaming audio data and to provide such data. An example of one such streaming audio server application 62 is the server portion of Streaming Media Services from Microsoft® Corporation. RealNetworks® of Seattle, Wash., and Apple Computer® of Cupertino, Calif. also make similar products. As described briefly above, the streaming audio server application 62 is operative to receive requests from a remotely executing media player application 64 and to stream the requested data to the media player application 64. The streaming audio server application 62 may transmit multiple data streams simultaneously. The number of possible streams would, however, be theoretically limited by the processing capacity of the instant messaging client computer 4 and the bandwidth of the computer's connection to the Internet 20. Additional details regarding the operation of the instant messaging client application 60, the streaming audio server application 62, and the media player application 64 will be described below with reference to FIGS. 4-13.

Figure 4A:
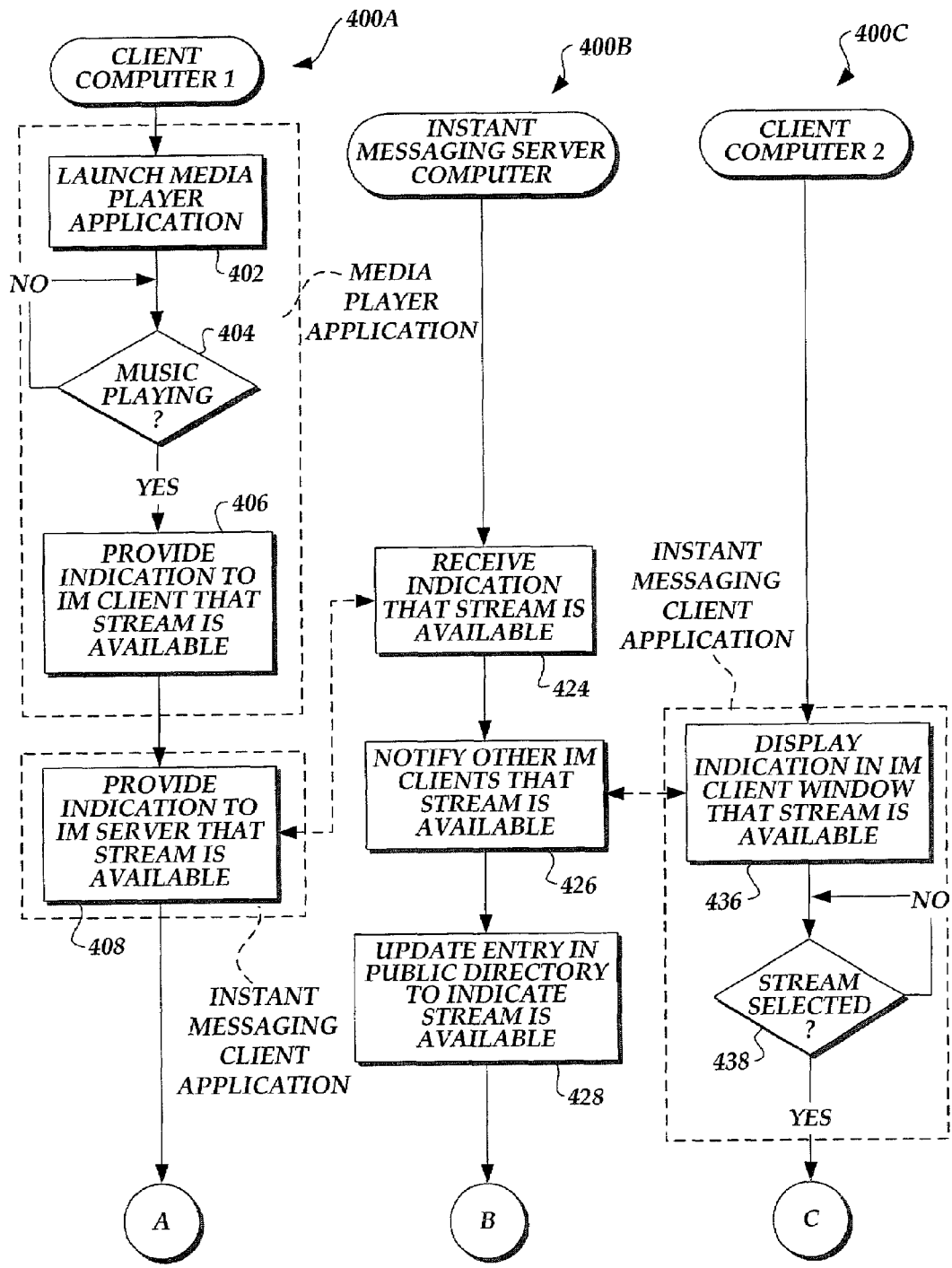
FIGS. 4A-4B are flow diagrams showing illustrative routines for integrating an instant messaging client application program, a streaming audio server application program, and an audio playback application program according to an actual embodiment of the present invention.
Figure 4B:
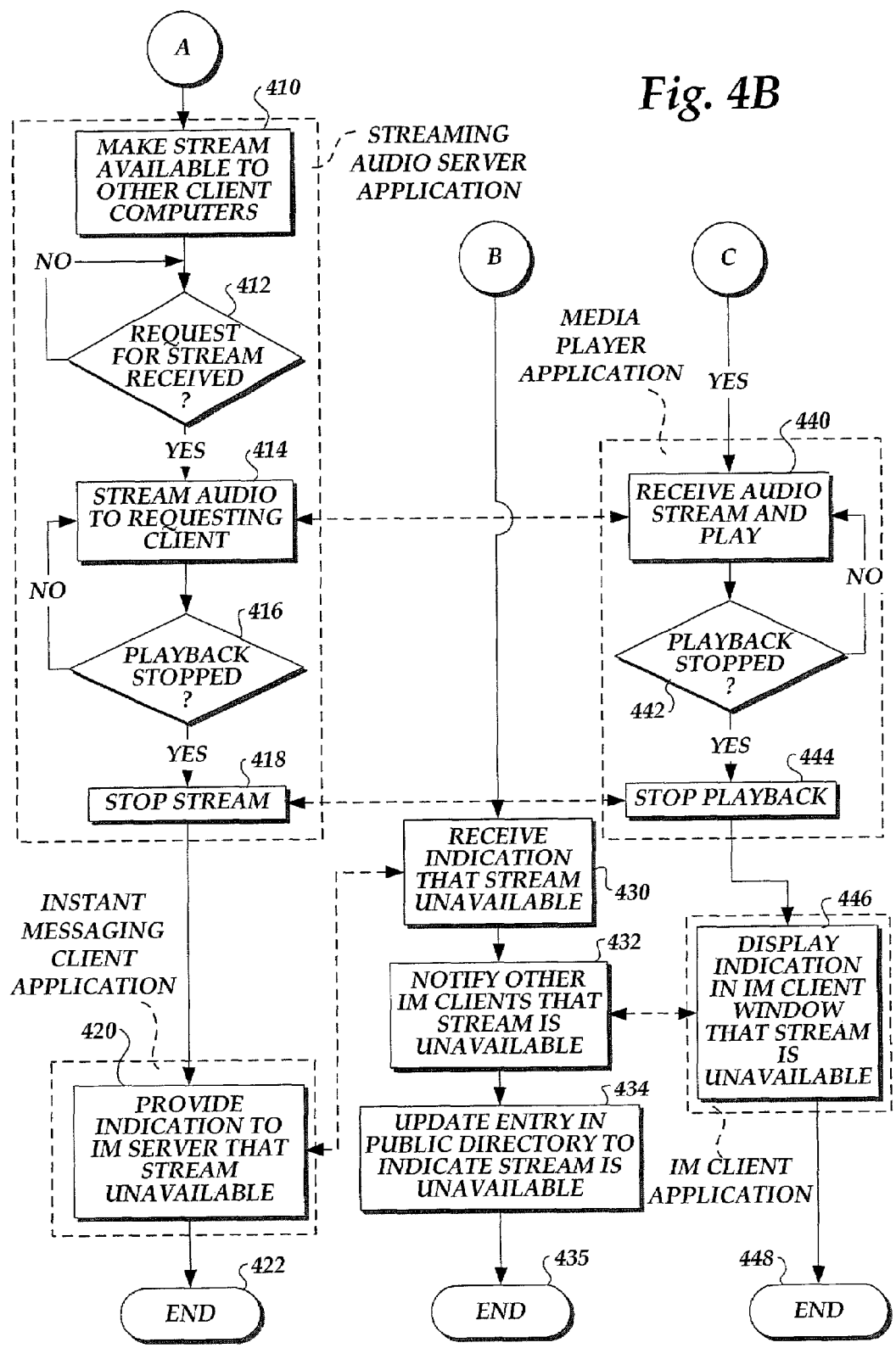

Turning now to FIGS. 4A and 4B, three illustrative routines 400A, 400B, and 400C, will be described illustrating the operation of a first instant messaging client computer, an instant messaging server computer, and a second instant messaging client computer, respectively. While the routines 400A, 400B, and 400C will be described together, those skilled in the art should appreciate that each of the routines illustrates the operation of the respective computer and that each of the routines function separately. Those skilled in the art should also appreciate that while the routines 400A and 400C illustrate the operation of two different instant messaging client computers, the instant messaging client application executing on these computers is the same. The routines 400A and 400C simply illustrate different aspects of the execution of the instant messaging client application.

The routine 400A begins at block 402 where a media player application is launched on a first instant messaging client computer. As described above, the media player application provides functionality for playing audio compact discs and encoded MP3 files. The routine 400A continues from block 402 to block 404, where a determination is made as to whether the media player application is playing music. If the media player application is not playing music, the routine 400A returns to block 404 where another such determination is made. If, at block 404, it is determined that the media player application is playing music, the routine 400A continues to block 406.

At block 406, an indication is provided by the media player application to an instant messaging client application executing on the same computer that an audio stream is available. Methods for providing such inter-process communications are well known to those skilled in the art. The routine 400A continues from block 406 to block 408, where the instant messaging client application provides an indication to an instant messaging server computer that an audio stream is available for a playback. The instant messaging server computer receives this indication at block 424 of routine 400B. In response to receiving such an indication, the instant messaging server computer notifies other instant messaging client applications that a stream is available from the first instant messaging client computer. This process is shown at block 426 of routine 400B, and may include notifying instant messaging client applications that are identified in a buddy list that the stream is available. As shown at block 428 of routine 400B, this may also include updating an entry in a public directory to indicate that a stream is available from the first instant messaging client computer.

At block 436 of routine 400C, a second instant messaging client computer receives a notification from the instant messaging server computer that an audio stream is available. The second instant messaging client computer displays an indication in the instant messaging client application window that a stream is available. According to an actual embodiment of the present invention, the indication comprises an icon displayed in a buddy list window adjacent to an entry for the first instant messaging client computer. From block 436, the routine 400C continues to block 438, where a determination is made as to whether a user has selected this indication. By selecting the indication, the user may cause the second instant messaging client computer to connect to the streaming audio server application executing on the first instant messaging client computer and to receive the audio stream. If the indicator has not been selected at block 438, the routine 400C returns to block 438 where another determination is made. If the indicator is selected at block 438, the routine 400C continues to block 440.

Returning now to routine 400A shown in FIG. 4B, the first instant messaging client computer executes the streaming audio server application at block 410 and makes the currently playing stream available to other instant messaging client computers. At block 412, a determination is made as to whether any other instant messaging client computer has requested the audio stream. If no such request has been made, the routine 400A returns to block 412 where another determination is made. If such a request is received at block 412, the routine 400A continues to block 414, where the streaming audio server application streams the currently playing audio track to the requesting instant messaging client computer. For instance, at block 440 of routine 400C, the second instant messaging client computer receives the audio stream from the streaming audio server application and plays the audio stream. At block 416 of routine 400A, a determination is made as to whether the streaming audio playback should be stopped. If the playback should not be stopped, the routine 400A returns from block 416 to block 414 where the streaming audio is continually streamed to the media player application. If playback is stopped, the routine 400A continues to block 418 where the stream is stopped. Correspondingly, at block 442 of routine 400C a determination is made as to whether a user has requested that playback be stopped by the media player application. If playback is not to be stopped, the routine 400C returns to block 440 where the audio stream is played. If a user does request that audio playback be stopped, the routine 400C continues from block 442 to block 444 where audio playback is stopped by the media player application. It should be appreciated that stopping playback on either of the first or second client computers will cause the audio stream to stop.

At block 420 of routine 400A, an indication is provided to the instant messaging server computer that the stream is unavailable if playback is stopped at the first client computer. The routine 400A then continues to block 422, where it ends. At block 430 of routine 400B, the instant messaging server computer receives the notification that the stream is unavailable. In response to this notification, the instant messaging server computer notifies other instant messaging client applications that the stream is unavailable at block 432. The instant messaging server computer also updates an entry in the public directory associated with the first instant messaging client computer to indicate that the stream is unavailable. This occurs at block 434 of routine 400B. The routine 400B then continues to block 435, where it ends. The second instant messaging client computer displays an indication in the instant messaging client application window that the stream is unavailable at block 446 of routine 400C. This may comprise removing the indicator from the buddy list or other indicator that was initially provide to indicate that a stream was available. The routine 400C then continues to block 448, where it ends.

Figure 5A:
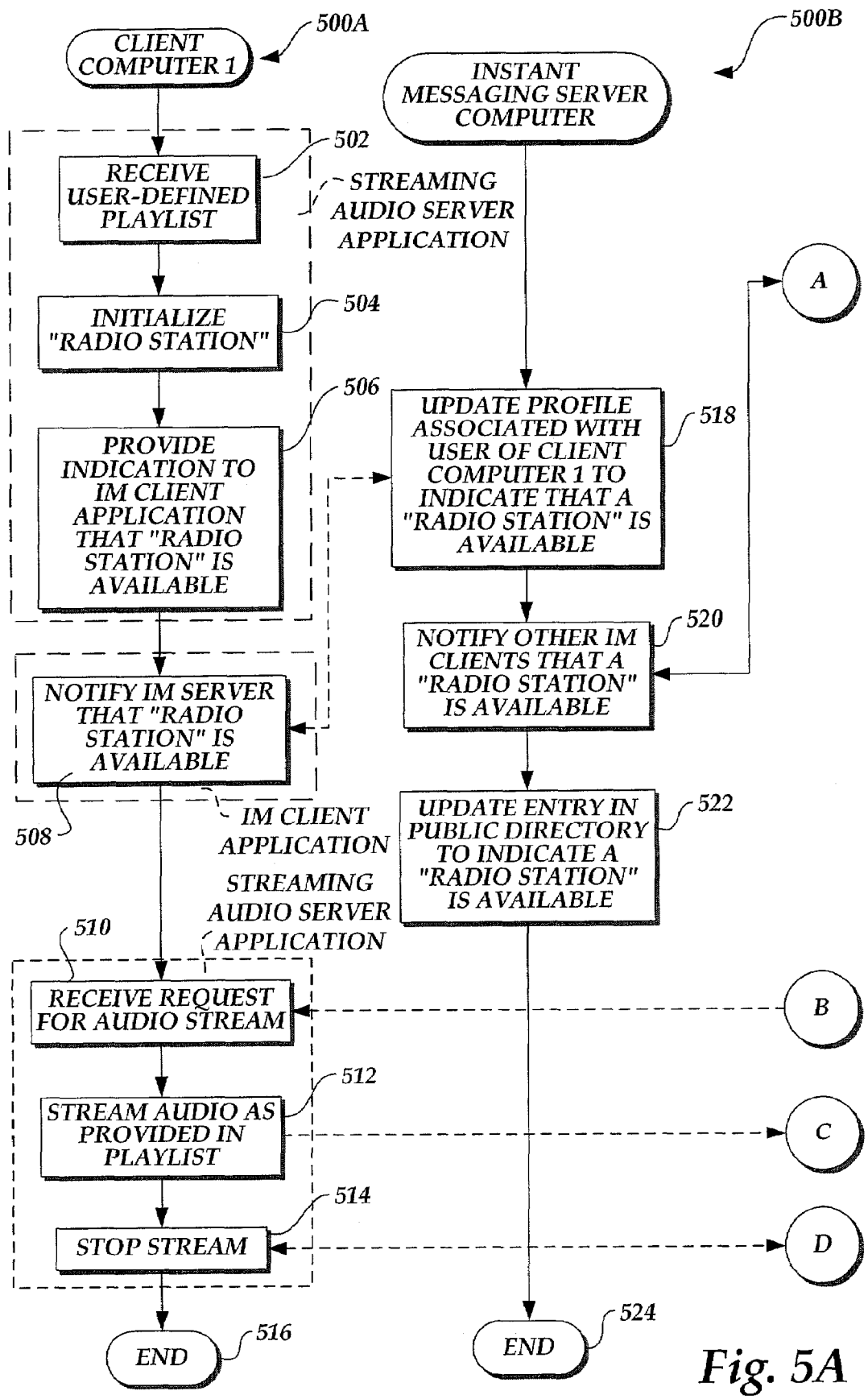
FIGS. 5A-5B are flow diagrams showing illustrative routines for integrating an instant messaging client application program, a streaming audio server application program, and an audio playback application program according to an actual embodiment of the present invention.
Figure 5B:
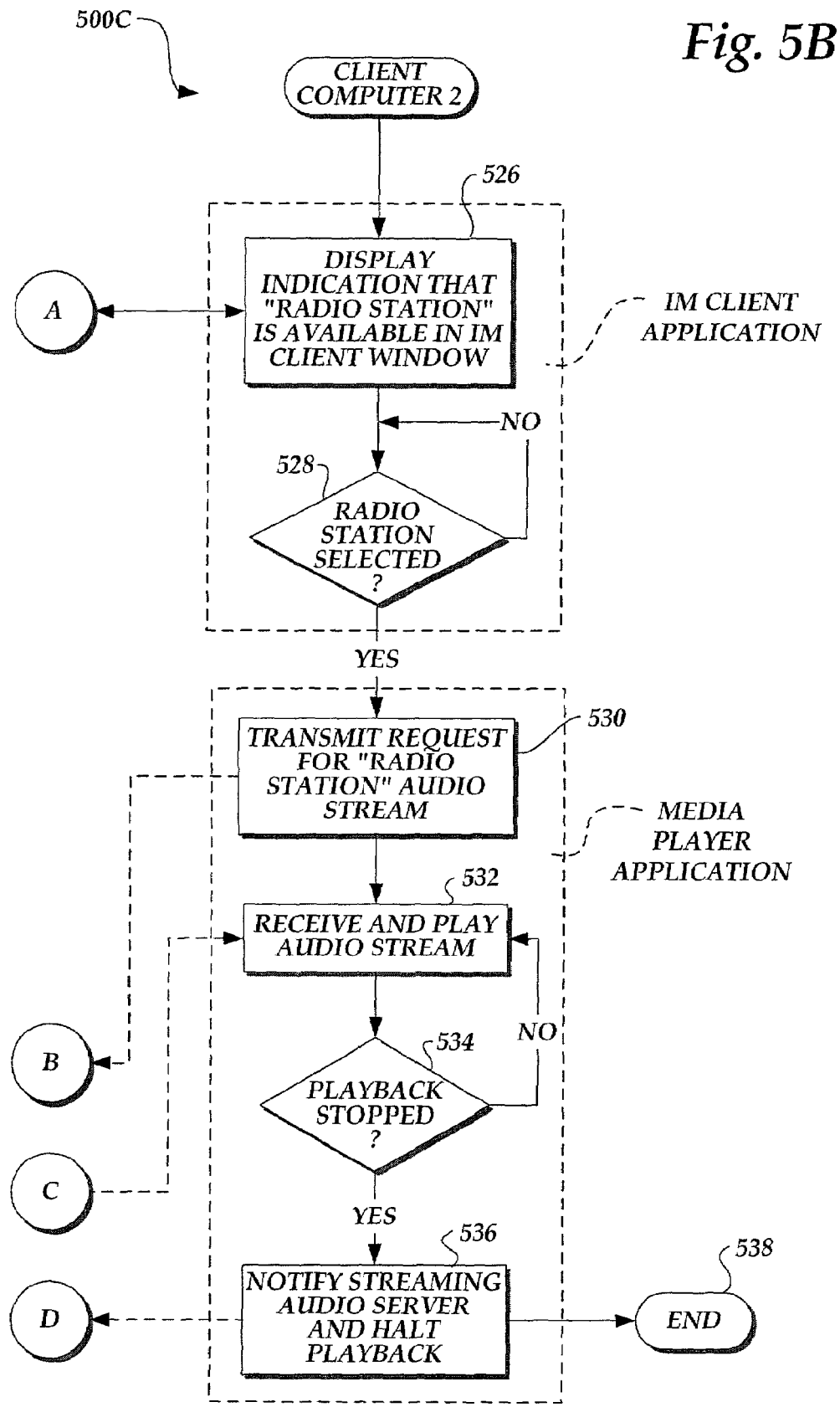

Turning now to FIGS. 5A and 5B, the operation of a first instant messaging client computer, an instant messaging server computer, and a second instant messaging client computer, respectively, according to another embodiment of the present invention will be described. According to the embodiment of the present invention shown in FIGS. 5A and 5B, an instant messaging client computer may be utilized to provide a streaming audio radio station. Selected instant messaging subscribers may be provided access to the streaming audio radio station through the instant messaging client application. Routine 500A illustrates the operation of a first instant messaging client computer that is utilized to serve the streaming audio radio station. Routine 500B shows the operation of an instant messaging server computer. Routine 500C illustrates the operation of a second instant messaging client computer executing an instant messaging client application and a media player application, and utilized to listen to a portion of the streaming audio radio station provided by the first instant messaging client computer.

The routine 500A begins at block 502, where a user defined playlist is received. As known to those skilled the art, a playlist comprises a list of audio tracks to be played. From block 502, the routine 500A continues to block 504, where the streaming audio radio station is initialized. Once the radio station has been initialized, the routine 500A continues to block 506, where an indication is provided to the instant messaging client application that the streaming audio radio station is available. From block 506, the routine 500A continues to block 508 where the instant messaging client application transmits a notification to the instant messaging server computer that a streaming audio radio station is available.

At block 518 of routine 500B, the instant messaging server computer receives the notification from the instant messaging client application that a streaming audio radio station is available. In response to receiving the notification, the instant messaging server computer updates a profile associated with a user of the client computer upon which the instant messaging client application is executing. This updated profile indicates that a streaming audio radio station is available from the instant messaging client computer. From block 518, the routine 500B continues to block 520, where other instant messaging client applications are notified by the instant messaging server computer that a streaming audio radio station is available. In particular, other instant messaging client applications that include a reference to the user broadcasting the streaming audio radio station in their buddy list are notified. Similarly, at block 522, the instant messaging server computer updates an entry in a public directory to indicate that a streaming audio radio station is available from the first instant messaging client computer.

At block 526 of routine 500C shown in FIG. 5B, a second instant messaging client computer receives the notification from the instant messaging server computer that a streaming audio radio station is available. The instant messaging client application executing on the second instant messaging client computer displays an indication that a radio station is available in the instant messaging client window. Screen diagrams showing such an indication will be described below with reference to FIGS. 9-12.

From block 526, the routine 500C continues to block 528, where a determination is made as to whether a user has made a selection of the streaming audio radio station indicator on the instant messaging client application window. If no such selection has been made, the routine 500C returns to block 528 where another determination is made. If such a selection has been made, the routine 500C continues from block 528 to block 530, where a request is transmitted from the second instant messaging client computer to the first instant messaging client computer for the radio station audio stream. This request is received at the first instant messaging client computer at block 510 of routine 500A shown in FIG. 5A.

At block 512 of routine 500A, the streaming audio server application executing on the first instant messaging client computer streams the radio station to the second instant messaging client computer. This typically includes providing a stream of data representing the audio tracks defined by the playlist. Methods and systems for streaming audio in this manner are well known to those skilled in the art.

The second instant messaging client computer receives and plays the audio stream at block 532 of routine 500C. At block 534 of routine 500C, a determination is made as to whether a user has stopped playback of the streaming audio radio station on the second client computer. If playback has not been stopped, the routine 500C returns to block 532 where the audio stream is continuously played. If, at block 534, it is determined that playback has been stopped, the routine 500C continues to block 536, where notification is sent from the media player application executing on the second instant messaging client computer to the streaming audio server application executing on the first instant messaging client computer. The notification informs the streaming audio server application that the playback of the streaming audio radio station has been stopped. Also at block 536, the audio portion of the playback is stopped. The routine 500C ends at block 538.

The streaming audio server application receives the notification that playback has been stopped at block 514 and stops the transmission of the streaming audio radio station. The routine 500A then continues from block 514 to block 516, where it ends. It should be appreciated that while the streaming audio server application stops the stream to the second client computer, the streaming audio server application does not interrupt streams being sent to other client computers and continues to receive and process requests for streams. The routine 500B ends at block 524.

Figure 6A:
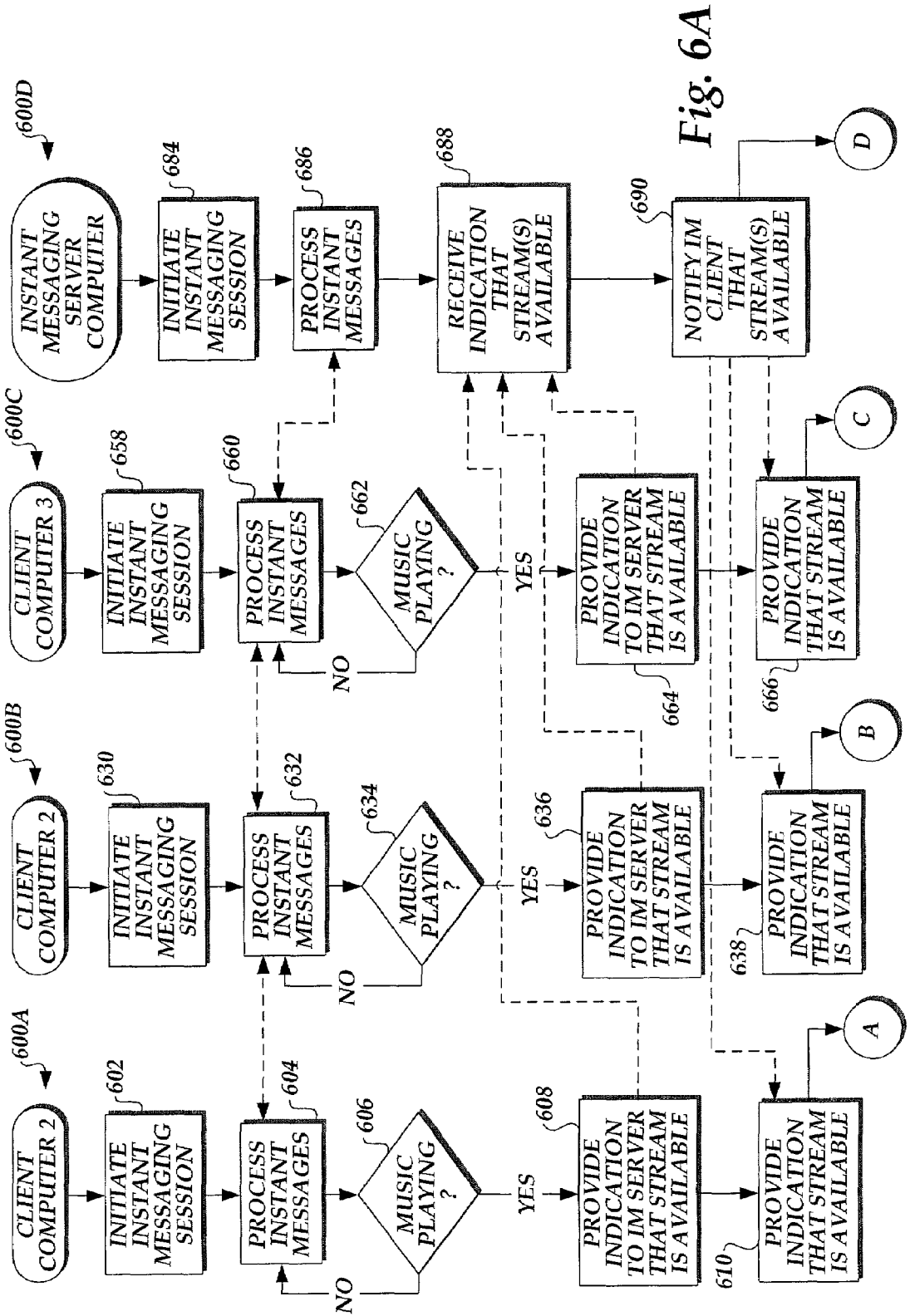
FIGS. 6A-6C are flow diagrams showing illustrative routines for integrating an instant messaging client application program, a streaming audio server application program, and an audio playback application program according to an actual embodiment of the present invention.
Figure 6B:
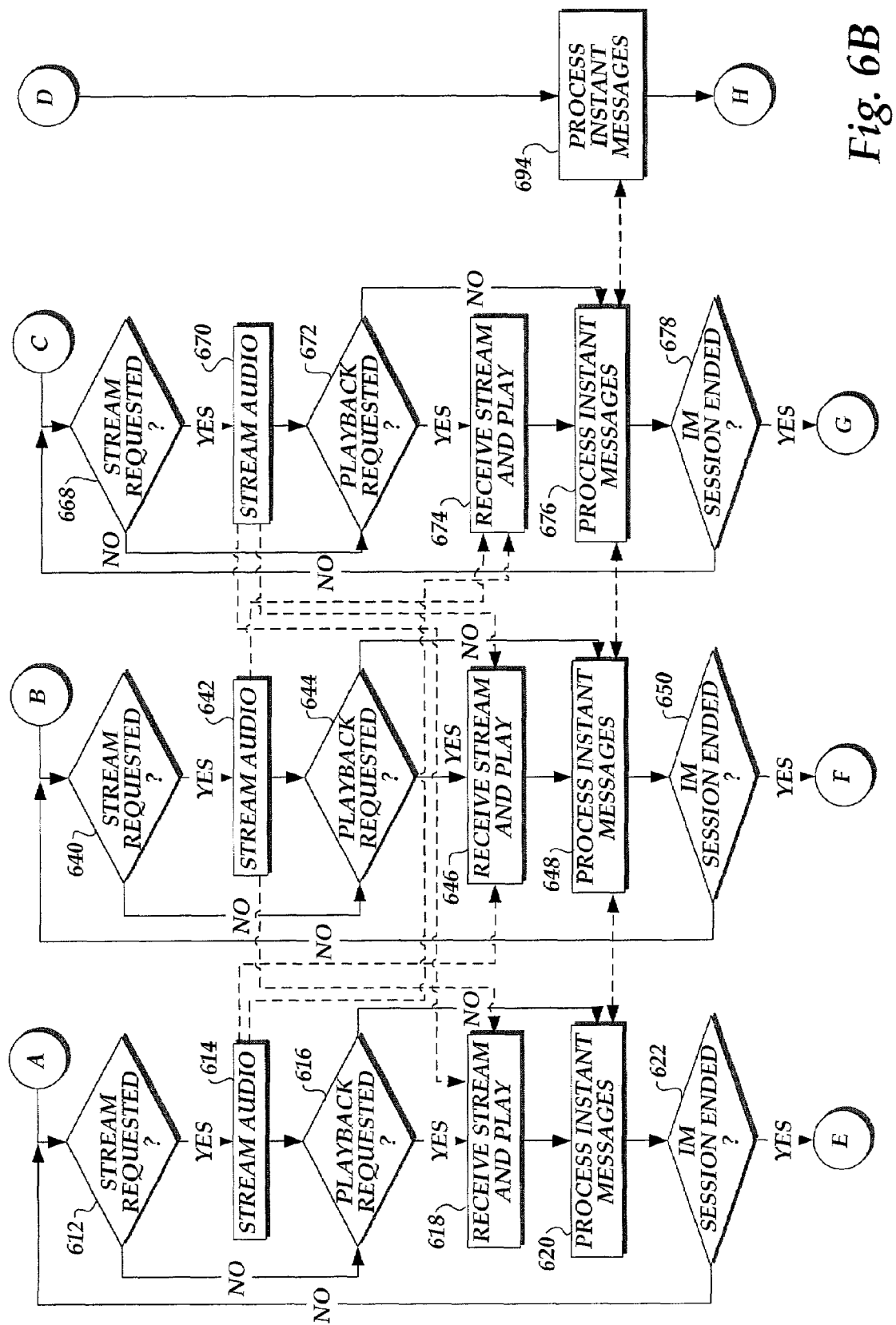
Figure 6C:
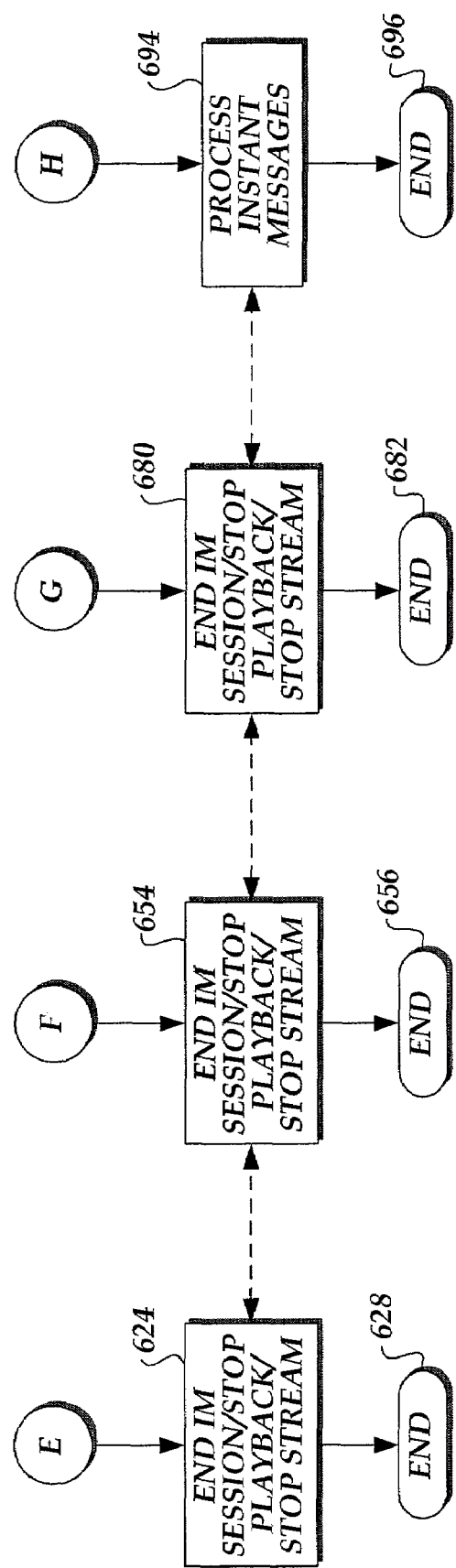

Turning now to FIGS. 6A-6C, routines 600A, 600B, 600C, and 600D will be described. As will be described in greater detail below, these routines describe functionality for allowing instant messaging subscribers engaged in an instant messaging session to listen to audio tracks streamed by other instant messaging subscribers participating in the session. In particular, the routines 600A, 600B, 600C, and 600D allow a user to listen to a stream currently being played by another user in an instant messaging session. In this manner, any one of a number of instant messaging subscribers may listen to audio tracks available from any other subscriber participating in the instant messaging session.

The routine 600A begins at block 602, where an instant messaging session is initiated between a first instant messaging client computer and one or more other instant messaging client computers. Blocks 630 and 658 of routines 600B and 600C, respectively, show a second instant messaging client computer and a third instant messaging client computer joining in the instant messaging session. At block 684 of routine 600D, the instant messaging server participates in the initiation process and mediates the instant messaging session between the first, second, and third instant messaging client computers.

At block 604 of routine 600A, instant messages are processed. This may include receiving instant messages from any of the other instant messaging client computers participating in the session and displaying them, or transmitting messages to the instant messaging server computer. A similar process is performed by the second and third instant messaging client computers at blocks 632 and 660 of routines 600B and 600C, respectively. At block 686 of routine 600D, the instant messaging server computer mediates this message traffic and transmits the appropriate messages to the appropriate instant messaging server computers.

The routine 600A continues from block 604 to block 606, where a determination is made as to whether the media player application is currently playing music. If the media player application is not currently playing music, the routine 600A returns to block 604 where messages are continually processed. A similar determination is made for the second and third instant messaging client computers at blocks 634 and 662 of routine 600B and 600C, respectively.

If, at block 606 of routine 600A, it is determined that the media player application is currently playing music, the routine 600A continues to block 608. At block 608, an indication is provided by the instant messaging client application to the instant messaging server computer indicating that a stream is available. A similar process is performed by the second and third client computers, respectively, at block 636 and block 664. The instant messaging server computer receives these notifications at block 688 of routine 600D.

At block 690, the instant messaging server computer notifies each of the instant messaging client computers that a stream is available. Typically, the instant messaging client computer that is playing the audio stream that is the subject of the notification would not be notified. However, each of the other instant messaging client computers participating in an instant messaging session would be notified. The instant messaging client computers receive this notification from the instant messaging server computer at blocks 610, 638, and 666 of routines 600A, 600B, and 600C, respectively. At these blocks, the respective instant messaging client computers also provide a visual indication to the user that an audio stream is available from one of the other instant messaging client computers. User interfaces for providing such notifications will be described below with references to FIGS. 9-12.

At block 612 of routine 600A shown in FIG. 6B, a determination is made as to whether a user has requested the audio stream by selecting the visual indicator. A similar determination is made by the second and third instant messaging client computers at blocks 640 and 668 of routines 600B and 600C, respectively. If an audio stream is requested from the instant messaging client computer, the routine 600A continues to block 614, where the audio is streamed to the requesting instant messaging client computer. This streaming audio data may then be played back by the receiving instant messaging client computer. A similar operation is performed by the second and third instant messaging client computers at blocks 642 and 670, respectively.

If, at block 612 of routine 600A, it is determined that a stream has not been requested, the routine 600A branches to block 616. At block 616, a determination is made as to whether a user has selected the visual indicator to request playback of an audio stream available from one of the other instant messaging client computers. A similar determination is made at blocks 646 and 672 of routines 600B and 600C, respectively. If a user requests playback, the routine 600A continues to block 618, where the stream is requested from the offering instant messaging client computer and played. If, at block 616, it is determined that playback has not been requested, the routine 600A branches to block 620 where instant messages are continued to be processed. Similar blocks are recited for the routines 600B and 600C at steps 648, 650, 674, and 676.

The routine 600A continues from blocks 620-622, where a determination is made as to whether the instant messaging session has ended. If the instant messaging session has not ended, the routine 600A branches back to block 612 where the above-described processing is repeated. Similar branches are taken by the routines 600B and 600C at blocks 652 and 678, respectively.

If, at block 622, it is determined that the instant messaging session has ended, the routine 600A continues to block 624, shown in FIG. 6C, where the instant messaging session is stopped. In addition, playback of an audio stream from another instant messaging session participant is also stopped. Likewise, if the instant messaging client computer is streaming audio to another instant messaging client computer, the stream is ended. Similar processing occurs at blocks 654, 680, and 694 of the routines 600B, 600C, and 600D. The routines 600A, 600B, 600C, and 600D end at blocks 628, 656, 682, and 696, respectively.

While the foregoing discussion of FIGS. 6A-6C was described in the context of three instant messaging client computers participating in an instant messaging session, any number of instant messaging client computers may participate in a session, and any number of audio streams may be shared. As will be described in greater detail below with reference to FIG. 7, according to an additional embodiment of the invention, a "mix" of audio streams available from each of the instant messaging client computers may also be created. In one embodiment of the invention, audio tracks may be played alternately from each of the instant messaging client computers participation in the instant messaging session. According to another embodiment of the present invention, a random mix of tracks may be played.

Figure 7:
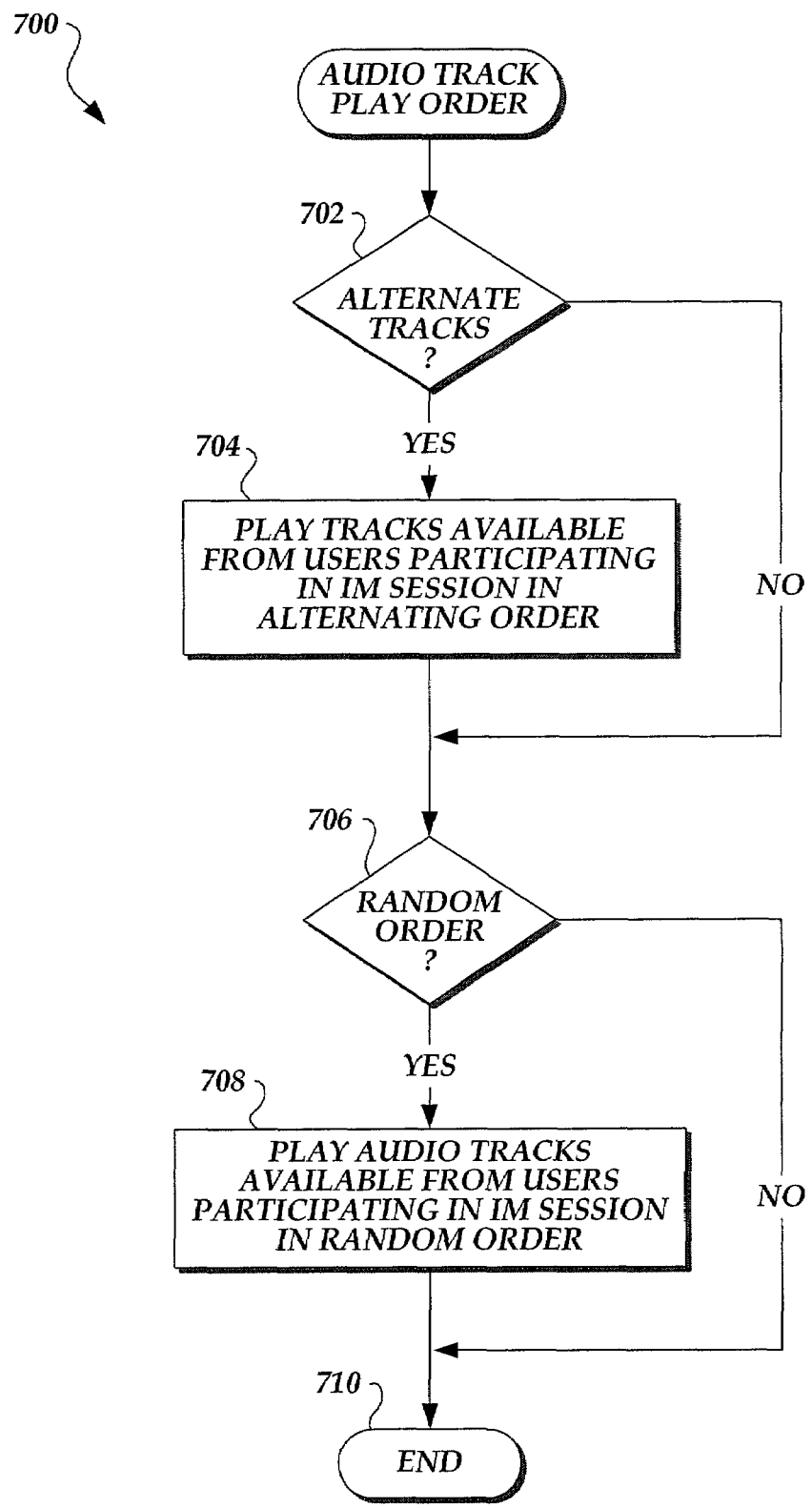
FIG. 7 is a flow diagram showing an illustrative routine for allowing a user to select random or alternating track playback of an audio stream according to an actual embodiment of the present invention.

Referring now to FIG. 7, an illustrative routine 700 will be described for changing the audio track play order for a number of participants in an instant messaging session. As described briefly above, when multiple audio streams are available from participants in an instant messaging session, tracks available within these audio streams may be played in an alternate or random order to provide a mix of music for each of the participants in the instant messaging session. This allows all users to share their music collections in a highly interactive manner.

Routine 700 begins at block 702, where a determination is made as to whether a user has selected a user interface item for playing streaming audio tracks in an alternating order. As will be described in greater detail below with reference to FIG. 12, a user interface item may be provided by the instant messaging client application that allows a user to select alternating or a random playback of streaming audio tracks. If, at block 702, it is determined that the user has selected a user interface item for playing back tracks in an alternating manner, the routine 700 continues to block 704. At block 704, tracks available from users participating in the instant messaging session are played in an alternating order. If, at block 702, it is determined that the user has not selected a user interface item for playing back tracks in an alternating fashion, the routine 700 branches to block 706.

At block 706, a determination is made as to whether a user has selected a user interface item for playing back audio tracks available from participating instant messaging client computers in a random order. If the user makes such a selection, the routine 700 continues to block 708, where audio tracks available from users participating in the instant messaging session are played in a random order. If, at block 706, it is determined that the user has not selected a user interface item for playing back tracks randomly, the routine 700 branches to block 710, where it ends.

Figure 8:
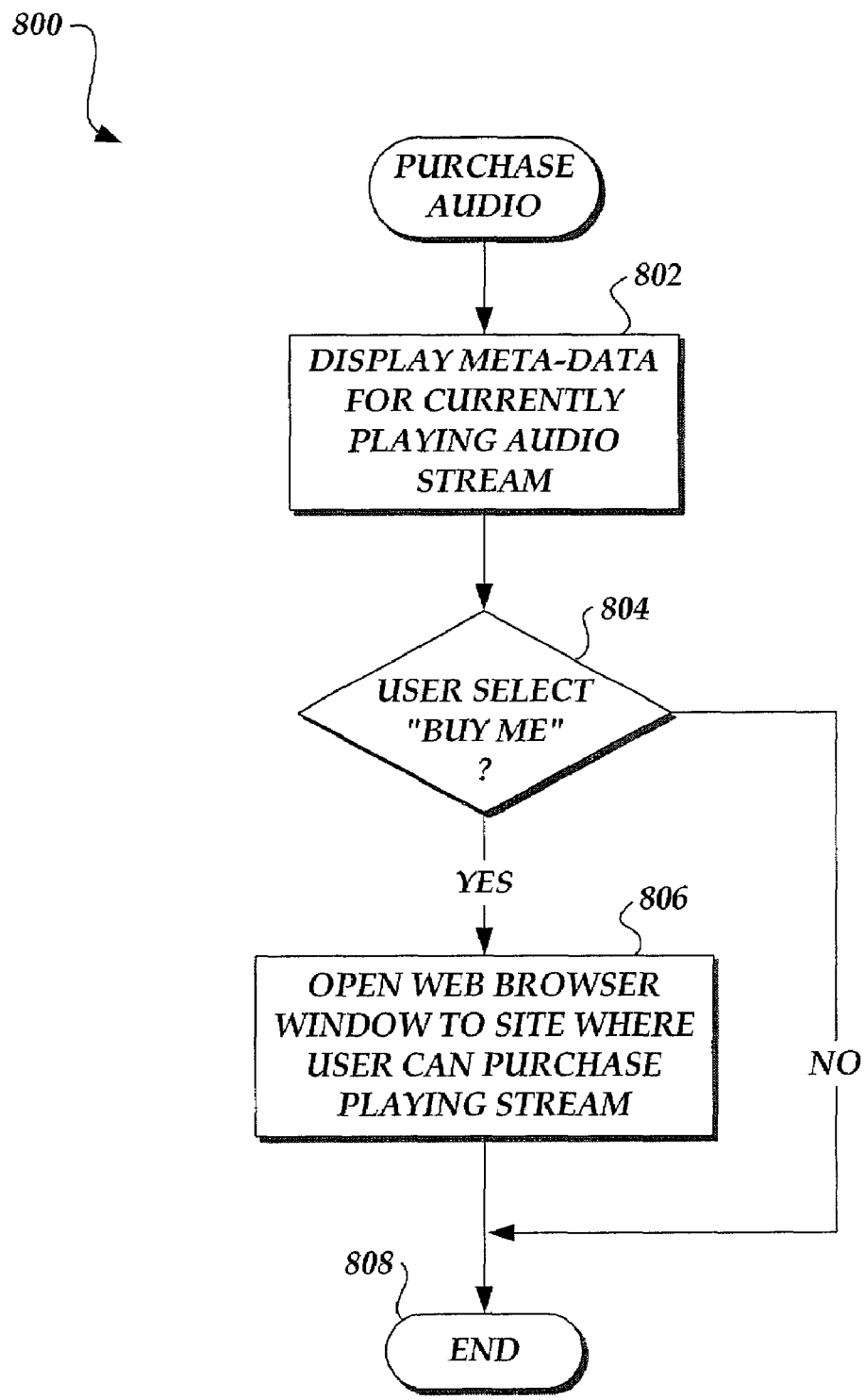
FIG. 8 is a flow diagram showing an illustrative routine for allowing a user to purchase a currently playing streaming audio track according to an actual embodiment of the present invention.

According to one actual embodiment of the present invention, meta-data is provided for each currently playing track in an audio stream. This meta-data may include information regarding the track, such as the song title, album, artist, and other pertinent information. This data may be displayed by the media player application, and may also be displayed in the instant messaging client application window. According to another embodiment of the present invention, an option may be provided to a user to buy the currently playing audio track. Turning now to FIG. 8, an illustrative routine 800 will be described for providing such functionality.

The routine 800 begins at block 802, where meta-data associated with the currently playing audio stream is displayed. As mentioned briefly above, this data may be displayed in the instant messaging client application window. An illustrative user interface for displaying data in this manner will be described below with reference to FIG. 11. Additionally, the meta-data may be displayed in the window associated with the media player application. An illustrative user interface for providing such a display will be described below with reference to FIG. 13. Additionally, an option may be provided in either the instant messaging client application window or the media player application window that allows a user to purchase the currently playing audio track.

The routine 800 continues from block 802 to block 804, where a determination is made as to whether the user has requested to buy the current playing audio track. If the user has selected such an option, the routine 800 continues from block 804 to block 806, where an Internet Web browser window is opened. The Web browser is directed to a Web site where a user may purchase the currently playing audio stream. An illustrative Web site for allowing a user to purchase a currently playing audio track will be described below with reference to FIG. 14. If, at block 804, it is determined that a user has not selected an option to purchase the currently playing audio track, the routine 800 continues to block 808, where it ends.

Figure 9:
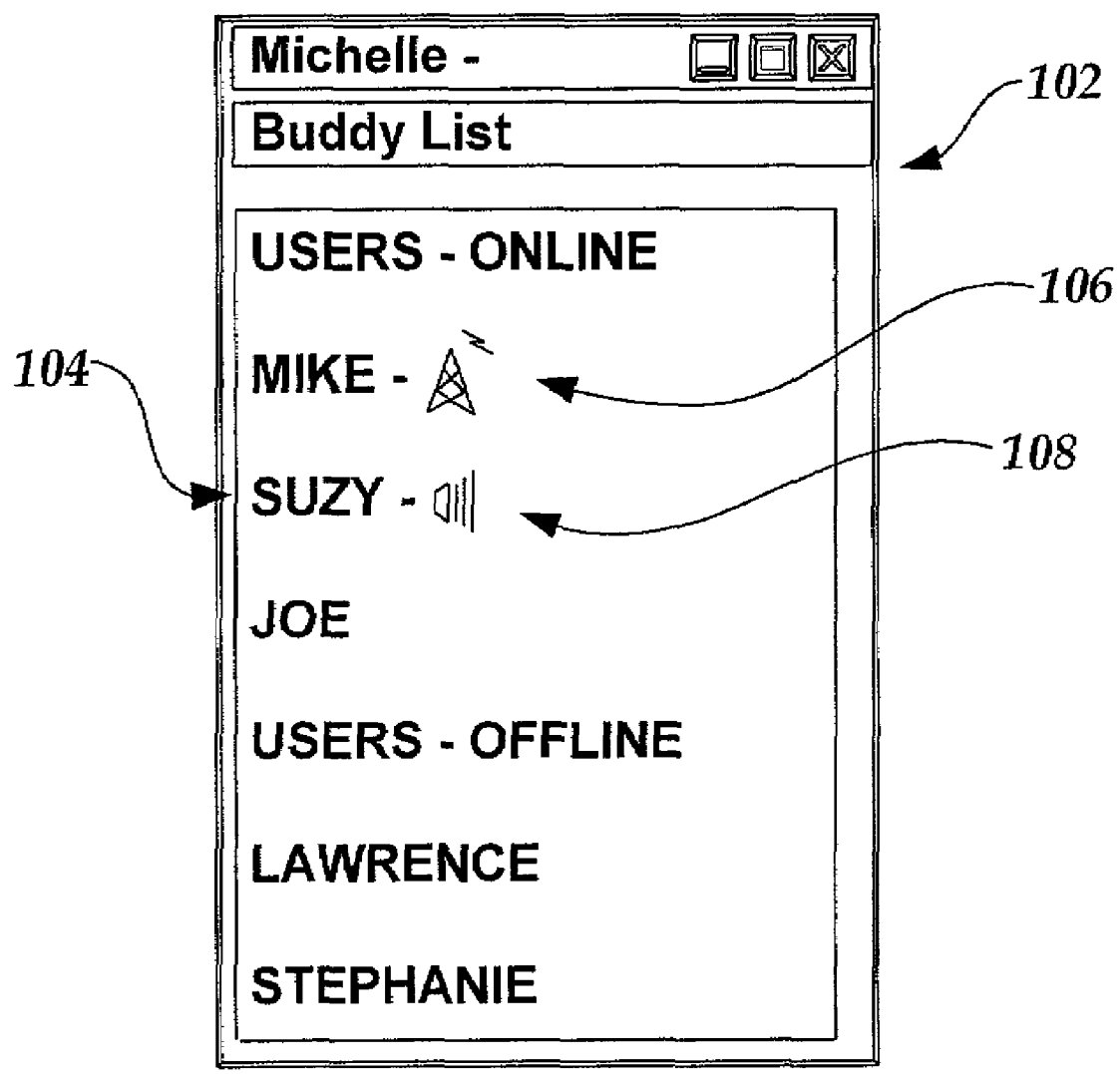
FIG. 9 is a screen diagram showing a buddy list window that includes streaming radio station and stream available indicators according to an actual embodiment of the present invention.

Turning now to FIG. 9, an illustrative user interface will be described for providing an indication to a user that an instant messaging subscriber is providing an audio stream. In particular, the buddy list window 102 contains a list 104 identifying users identified in the buddy list that are currently online with the instant messaging server computer. A visual indicator may be associated with each name on the list to show that the user is currently streaming audio. For instance, an icon 106 may be provided indicating that the user "Mike" is broadcasting a streaming audio radio station. Similarly, an icon 108 may be displayed indicating that a user "Suzy" is currently broadcasting an audio stream comprising the music that is currently playing on Suzy's computer. As described above, when a user contained in the buddy list makes an audio stream unavailable, the icons 106 and 108 will no longer be displayed.

Figure 10:
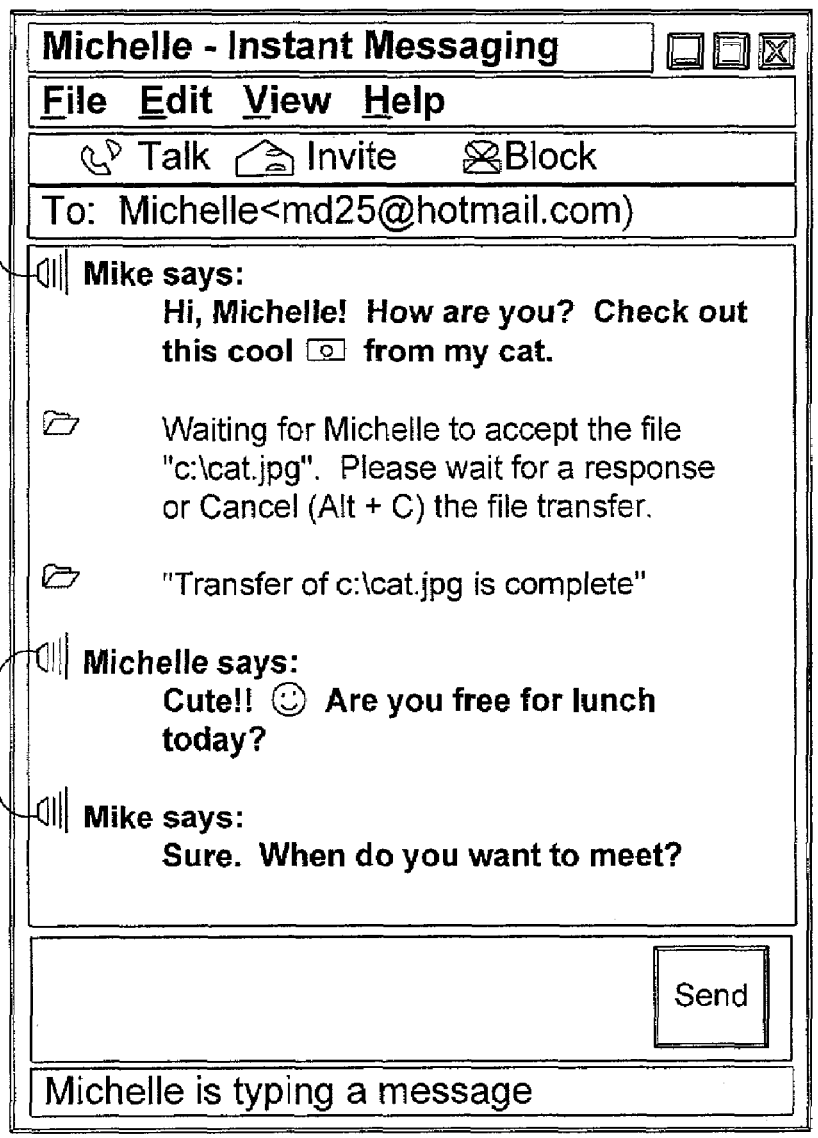
FIG. 10 is a screen diagram showing an instant messaging client window that includes stream available indicators according to an actual embodiment of the present invention.
Figure 11:
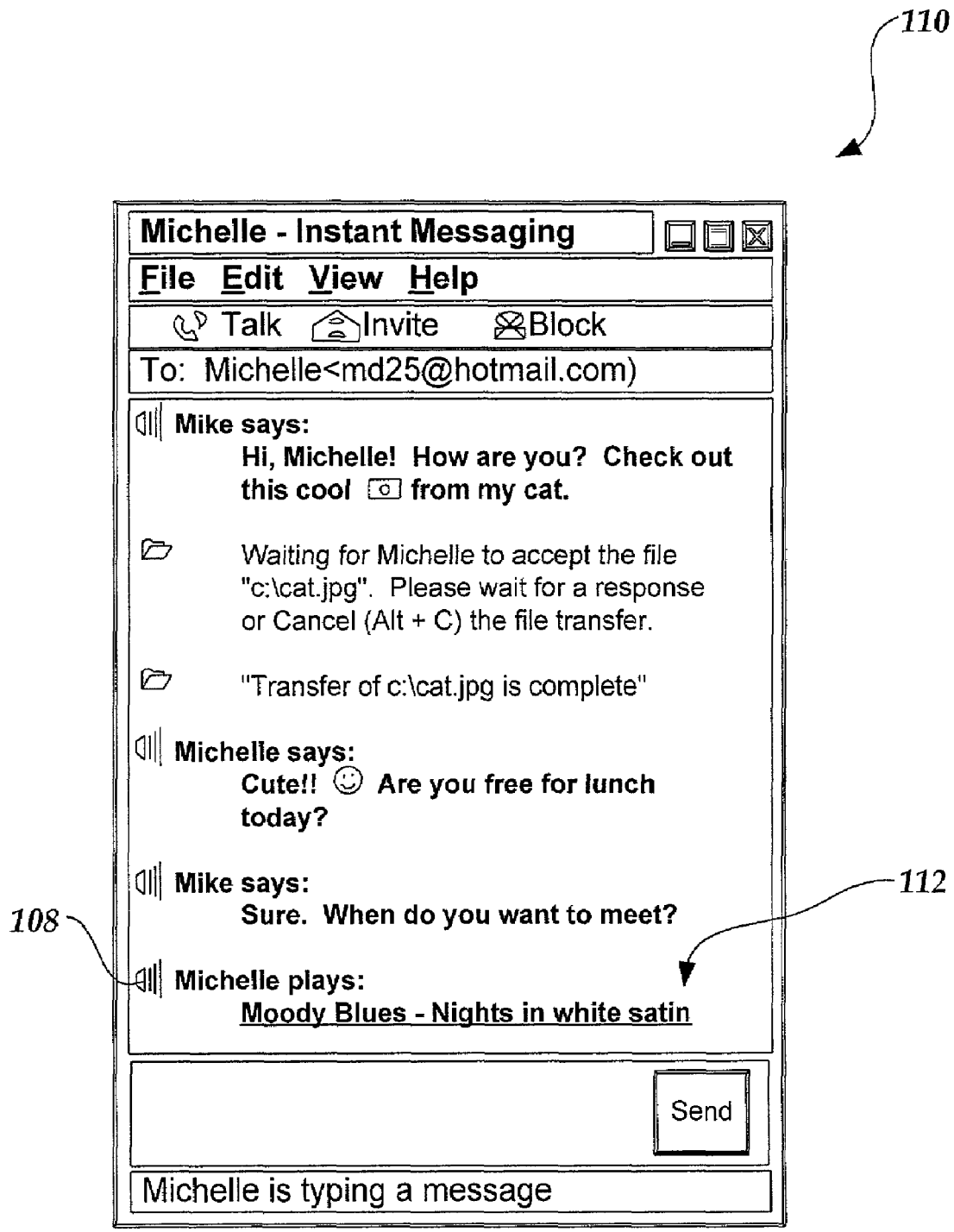
FIG. 11 is a screen diagram showing an instant messaging client window that includes stream available indicators according to an actual embodiment of the present invention.

Turning now to FIGS. 10 and 11, an illustrative user interface will be described for providing an indication during an instant messaging session that an audio stream is available. In particular, as shown in FIG. 10, an icon 108 may be displayed next to a user's name that currently has an audio stream available. Each time that user transmits an instant message, the icon 108 will be displayed. Alternatively, the icon 108 may only be displayed in a buddy list. A user desiring to request the streaming audio may simply select the icon 108 to launch the media player application and connect to the available stream. Similarly, as shown in FIG. 11, a textual indication may be provided when a user plays an audio track on their computer. For instance, indicator 112 shows that the user "Michelle" is playing the audio track entitled "Moody Blues—Knights in White Satin." This type of display may be utilized on a "down level" instant messaging client application. The indicator 112 may comprise a hyperlink that, when selected, launches a Web browser and takes the user to a Web site where the selected audio track may be purchased. Alternately, selection of the indicator 112 may launch the media player application and connect the application to the stream available from "Michelle." Additional meta-data may also be displayed in the instant messaging client application window 110.

Figure 12:
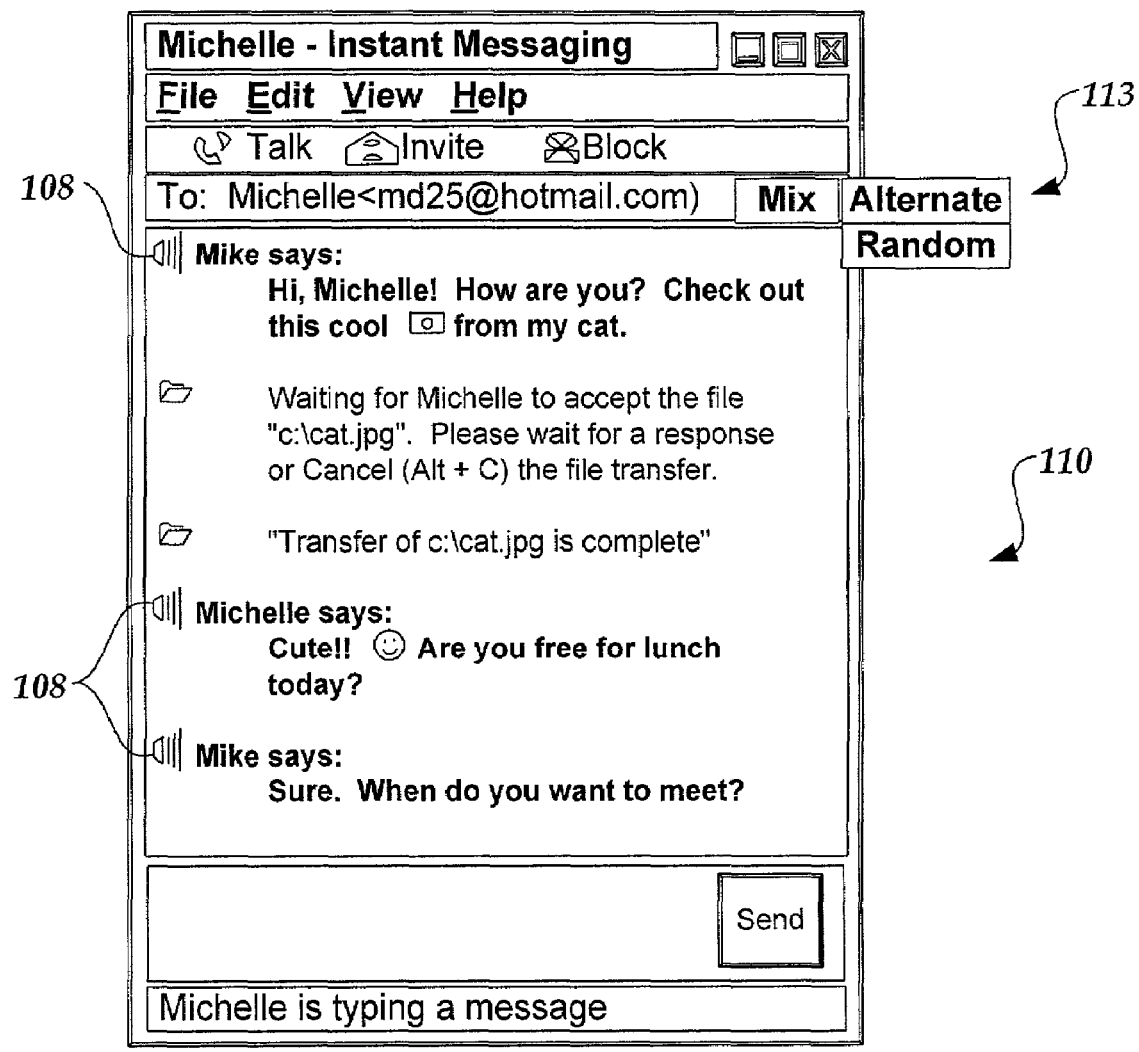
FIG. 12 is a screen diagram showing an instant messaging client window that includes stream available indicators according to an actual embodiment of the present invention.

As shown in FIG. 12, a menu 113 may also be provided that allows a user to select whether tracks available from multiple users participating in the instant messaging session should be played in an alternating or random fashion. For instance, as shown in FIG. 12, icon 108 indicates that the user "Mike" and the user "Michelle" have audio streams available. By selecting either the alternate or random menu items from the menu 113, an alternating or random mix of the streams available from "Mike" and "Michelle" may be played.

Figure 13:
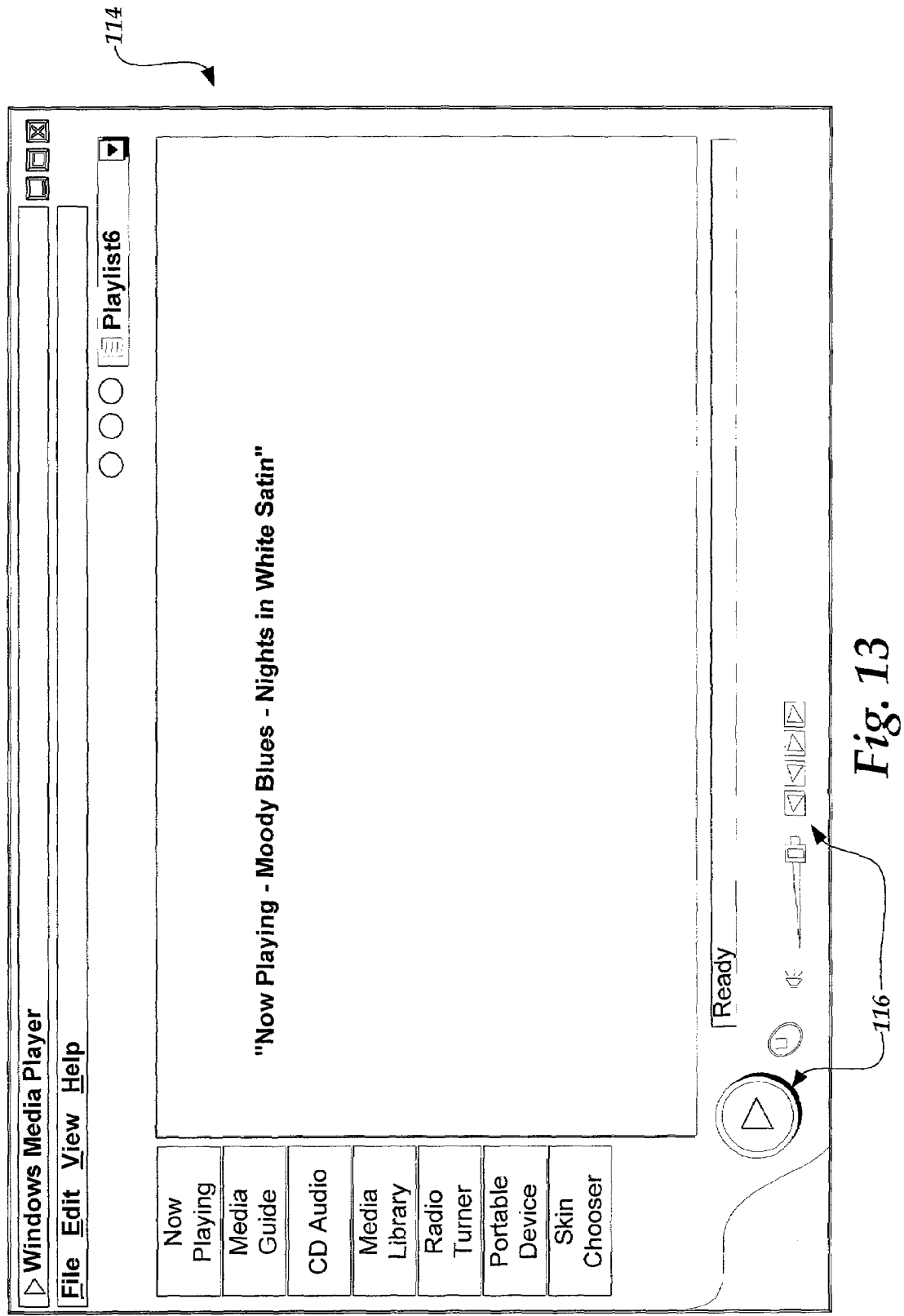
FIG. 13 is a screen diagram showing a media player application window utilized in an actual embodiment of the present invention.

Turning now to FIG. 13, an illustrative user interface for a media player application will be described. As shown in FIG. 13, the media player application window 114, comprises a set of transport controls 116 for playing back an audio CD, an audio stream, or other type of media. The media player application window 114 may also display meta-data regarding the currently playing song. For instance, the media player application window 114 may indicate that the track "Moody Blues—Knights in White Satin" is currently playing. Selection of this indication may cause the media player application window 114, or a Web browser, to display information regarding how a user may purchase the currently playing audio track. Other aspects of the media player application window 114 are known to those skilled in the art.

Figure 14:
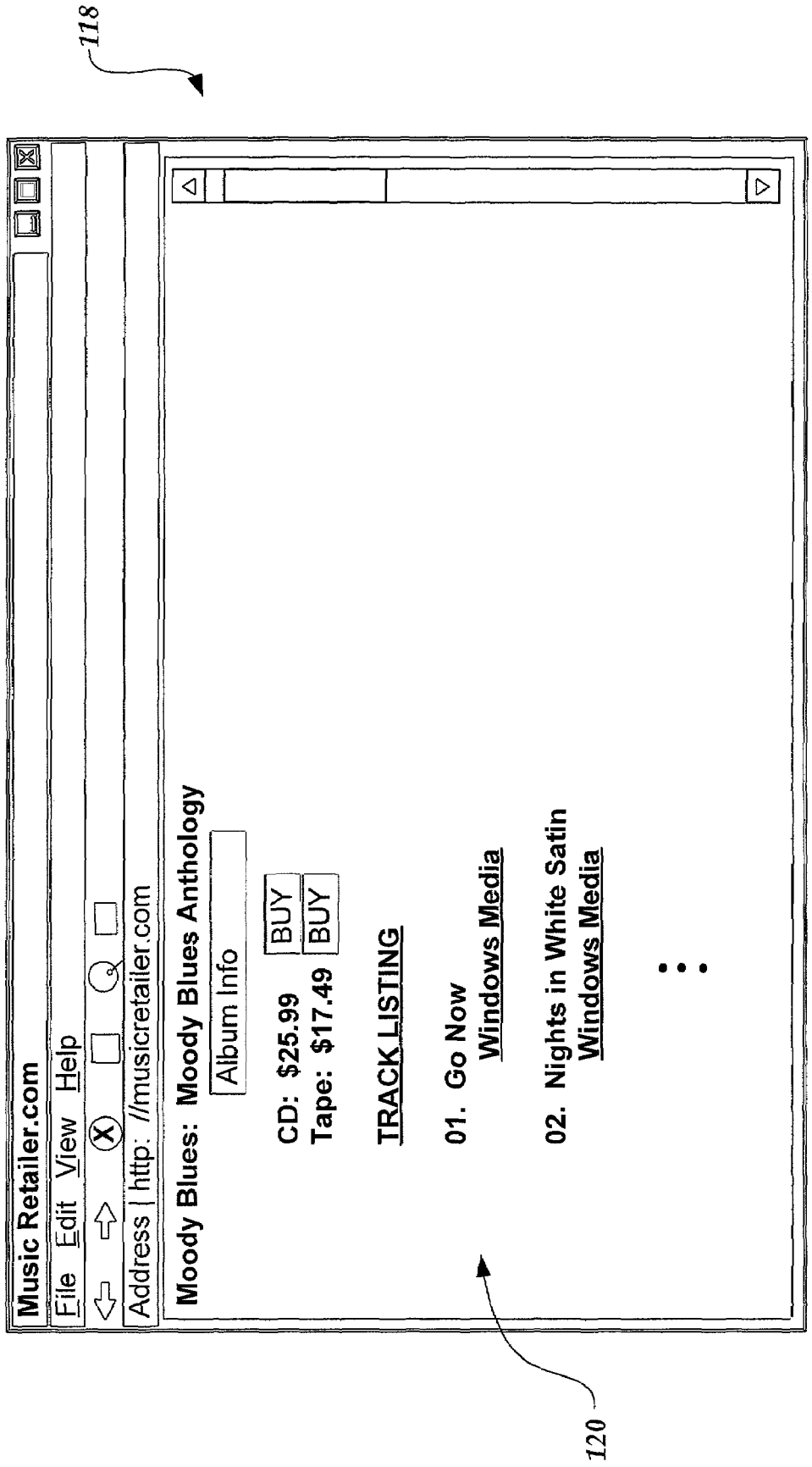
FIG. 14 is a screen diagram showing a Web browser window utilized in an actual embodiment of the present invention to allow a user to purchase a copy of a currently playing streaming audio track.

Turning now to FIG. 14, an illustrative Web site for purchasing an audio track will be described. The Web browser application window 118 shows a Web site 120, where a user may purchase a copy of the currently playing audio track. To provide such functionality, a description of the currently playing audio track may be provided along with prices for the purchase of the track. A track listing and audio samples may also be provided. Additional aspects of such a Web site are known to those skilled in the art.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for integrating audio playback, streaming audio, and instant messaging in a client computer system, comprising:
receiving an indication that an audio track is being played back by said client computer, wherein the indication is sent by a media player application on the client computer to an instant messaging client application on the client computer;
in response to receiving said indication, automatically providing a notification to a remote computer that an audio stream corresponding to said audio track is available at said client computer system for playback, wherein the indication is received by the instant messaging client application and the notification is provided by the instant messaging client application;
receiving a request at said client computer for said audio stream, wherein said request is received by a streaming audio server application on the client computer; and
in response to said request, transmitting said audio stream directly from said client computer to a remote computer making said request so that a user on the remote computer can listen to the audio track in real time, wherein the audio stream is transmitted to the remote computer without going through a central server.

2. The method of claim 1, wherein providing a notification to a remote computer comprises transmitting a notification from said instant messaging client application to a second client computer indicating that an audio stream is available at said client computer for playback, and wherein said remote computer comprises said second client computer.

3. The method of claim 1, wherein receiving a request at said client computer for said audio stream comprises receiving a request from said remote computer for said audio stream.

4. The method of claim 1, wherein receiving a request at said client computer for said audio stream comprises receiving a request from a media player application executing on said remote computer for said audio stream.

5. The method of claim 1, further comprising receiving an indication that an audio stream is available for playback from said remote computer.

6. The method of claim 5, further comprising providing a visual indication that said audio stream is available for playback from said remote computer.

7. The method of claim 6, wherein said visual indication is provided at a markup language page.

8. The method of claim 6, wherein said visual indication is provided at said instant messaging client application.

9. The method of claim 8, wherein said visual indication is provided in a buddy list window.

10. The method of claim 8, wherein said visual indication is provided in an instant messaging client application window.

11. The method of claim 5 further comprising:
receiving an indication that said audio track is not being played back by said client computer; and
in response to receiving said indication, providing an indication to a remote computer that said audio stream corresponding to said audio track is not available at said client computer system for playback.

12. A method for integrating audio playback, streaming audio, and instant messaging in a client computer system, comprising:
receiving an indication that a streaming audio radio station is available at said client computer, wherein the indication is sent by a media player application on the client computer to an instant messaging client application on the client computer;
in response to receiving said indication, automatically providing a notification to a remote computer that said streaming audio radio station is available at said client computer system for playback, wherein the indication is received by the instant messaging client application and the notification is provided by the instant messaging client application;

receiving a request at said client computer for said streaming audio radio station; and in response to said request, transmitting streaming audio radio station directly from said client computer to a remote computer making said request, wherein the audio stream is transmitted to the remote computer without going through a central server.

13. The method of claim 12, wherein providing a notification to a remote computer comprises transmitting an indication from said instant messaging client application to an instant messaging server computer indicating that streaming audio radio station is available at said client computer for playback.

14. The method of claim 12, wherein said streaming audio radio station comprises one or more consecutive audio tracks, and wherein said audio tracks are defined by a play list.

15. The method of claim 14, further comprising receiving an indication that a streaming audio radio station is available from said remote computer.

16. The method of claim 15, further comprising:
receiving a request to playback said streaming audio radio station available from said remote computer;
transmitting a request from said client computer to said remote computer for said streaming audio radio station available from said remote computer; and
receiving said streaming audio radio station available from said remote computer.

17. A computer-readable medium having stored thereon computer-executable instructions for performing a method of integrating audio playback, streaming audio, and instant messaging, the method comprising:
receiving an indication that an audio track is being played back by a first client computer, wherein the indication is sent by a media player application on the first client computer to an instant messaging client application on the first client computer;
in response to receiving said indication, automatically providing a notification to a remote computer that an audio stream corresponding to said auto track is available at said first client computer system for playback,
wherein the indication is received by the instant messaging client application and the notification is provided by the instant messaging client application;
wherein the remote computer comprises a second instant messaging client application in communication with the first instant messaging client application; and
wherein as a result of said communication, the first instant messaging client application displays in a first buddy list window an entry for the remote computer, and the second instant messaging client application displays in a second buddy list an entry for the first client computer;
receiving the notification at the remote computer and in response thereto displaying in the second buddy list window an icon adjacent to the entry for the first client computer, the icon for indicating to a user of the remote computer that the audio stream is available;
determining that the user of the remote computer selected the icon and in response thereto connecting the remote computer to a streaming audio server application on the first computer;
receiving a request at said first client computer for said audio stream;
in response to said request, transmitting said audio stream directly from said first client computer to the remote computer making said request so that the remote computer can play back the audio track, wherein the audio stream is transmitted to the remote computer without going through a central server; and
determining that at least one of the first client computer or the remote computer stopped the playback of the audio track, and in response thereto, stopping the audio stream.

18. A computer-controlled apparatus configured to perform a method for integrating audio playback, streaming audio, and instant messaging in a client computer system, the method comprising:
receiving an indication that a streaming audio radio station is available at a first client computer, wherein the indication is sent by a media player application on the first client computer to a first instant messaging client application on the first client computer;
in response to receiving said indication, automatically providing a notification to a remote computer that said streaming audio radio station is available at said first client computer for playback,
wherein the indication is received by the instant messaging client application and the notification is provided by the instant messaging client application;
wherein the remote computer comprises a second instant messaging client application in communication with the first instant messaging client application; and
wherein as a result of said communication, the first instant messaging client application displays in a first buddy list window an entry for the remote computer, and the second instant messaging client application displays in a second buddy list an entry for the first client computer;
receiving the notification at the remote computer and in response thereto displaying in the second buddy list window an icon adjacent to the entry for the first client computer, the icon for indicating to a user of the remote computer that the audio stream is available;
determining that the user of the remote computer selected the icon and in response thereto connecting the remote computer to a streaming audio server application on the first computer;
receiving a request at said first client computer for said streaming audio radio station; and
in response to said request, transmitting streaming audio radio station directly from said first client computer to the remote computer making said request so that the remote computer can play back the radio station, wherein the audio stream is transmitted to the remote computer without going through a central server; and
determining that at least one of the first client computer or the remote computer stopped the playback of the radio station, and in response thereto, stopping the audio stream.

* * * * *